United States Patent [19]

Hayes et al.

[11] Patent Number: 4,943,390
[45] Date of Patent: Jul. 24, 1990

[54] BIOEMULSIFIER-STABILIZED HYDROCARBOSOLS

[75] Inventors: Michael E. Hayes, Fernandina Beach; Kevin R. Hrebenar, Jacksonville; Patricia L. Murphy, Amelia Island; Laurence E. Futch, Jr., Fernandina Beach; James F. Deal, III, Amelia Island; Paul L. Bolden, Jr., Fernandina Beach, all of Fla.

[73] Assignee: Petroleum Fermentations N.V., Curacao, Netherlands Antilles

[21] Appl. No.: 251,071

[22] Filed: Sep. 28, 1988

Related U.S. Application Data

[60] Continuation of Ser. No. 780,774, Sep. 27, 1985, abandoned, which is a division of Ser. No. 653,808, Sep. 24, 1984, Pat. No. 4,684,372, which is a continuation-in-part of Ser. No. 547,892, Nov. 2, 1983, Pat. No. 4,618,348.

[51] Int. Cl.[5] .......................... B01F 17/16; B01J 13/00
[52] U.S. Cl. ........................ 252/355; 252/309; 252/312; 252/352; 252/353; 252/354; 252/356; 252/DIG. 6; 435/101; 210/925
[58] Field of Search ............... 252/309, 312, 352, 353, 252/354, 355, 356, DIG. 6; 435/101; 210/925

[56] References Cited

U.S. PATENT DOCUMENTS

| 3,686,133 | 8/1972 | Hattori | 252/354 |
| 3,910,855 | 10/1975 | Abeles | 252/354 |
| 3,986,979 | 10/1976 | Mooren et al. | 252/354 |
| 4,092,266 | 5/1978 | Abel et al. | 252/354 |
| 4,325,831 | 4/1982 | Watson et al. | 252/354 |
| 4,380,504 | 4/1983 | Gutnick | 252/352 X |

Primary Examiner—Mary C. Lee
Assistant Examiner—Catherine S. K. Scalzo
Attorney, Agent, or Firm—Pennie & Edmonds

[57] ABSTRACT

Methods and compositions are provided to facilitate the transportation and combustion of highly viscous hydrocarbons by forming reduced viscosity hydrocarbon-in-water emulsions, and in particular, bioemulsifier-stabilized hydrocarbon-in-water emulsions.

51 Claims, 9 Drawing Sheets

BIOEMULSIFIER-STABILIZED HYDROCARBOSOLS

This is a continuation of application Ser. No. 780,774, filed Sept. 27, 1985, now abandoned, which is a division of application Ser. No. 653,808, filed Sept. 24, 1984, now issued as U.S. Pat. No. 4,684,372, which in turn is a CIP of application Ser. No. 547,892, filed Nov. 2, 1983, now issued as U.S. Pat. No. 4,618,348.

TABLE OF CONTENTS

Introduction
Background of the Invention
  Viscous Hydrocarbons
  Transportation of Viscous Hydrocarbons
  Combustion of Oil-in-Water Emulsions
  Microbial Surface Active Compounds
Summary of the Invention
Nomenclature
Brief Description of the Figures
Detailed Description of the Invention
  Surfactant Packages
  Viscous Crude Oils and Residual Oils
  Emulsion Formation
    Formation of Pre-Atomized Fuels at High Temperatures
    Formation of Pre-Atomized Fuels Using A Thermally Cracked Hydrocarbon Discharge
    Mixing of a Slurry with a Pre-Atomized Fuel
  Properties of α-Emulsan-Stabilized Hydrocarbosols
  Blending of Hydrocarbons
  Transportation and Utilization of Hydrocarbosols
Examples
  Preparation of Bioemulsifiers
    Preparation of Technical Grade α-Emulsan
    Additional Preparations of *Acinetobacter calcoaceticus* Bioemulsifiers
  Viscous Hydrocarbon Characteristics
    Boscan Crude Oil
    Texas Fireflood Crude Oil
    Number 6 Residual Test Fuel Oil
    Union Cutback Tar
    California Vacuum Resid
    Oklahoma Vacuum Resid
    Catalytic Hydrogenated Resid (H-Oil)
    ROSE Resid
    German Visbreaker Resid
    Texas Visbreaker Resid
    Methods for Determining Hydrocarbon Characteristics
    Methods for Determining Hydrocarbon Characteristics, Including Asphaltene Content
  Viscosity Reduction Experiments
    Surfactant Packages and Emulsification of Hydrocarbons
    Effect of Methanol in Aqueous Phase on Pre-Atomized Fuel Viscosity
    Effect of Water Content on Pre-Atomized Fuel Viscosity
    Temperature Effects on Hydrocarbosols
    Comparative Static Testing
    Stabilizer Comparisons
    Mixing of a Slurry with a Pre-Atomized Fuel
    Formation of Pre-Atomized Fuels at High Temperatures under Pressure
    Formation of Pre-Atomized Fuels Using a Thermally Cracked Hydrocarbon Discharge
    Pipelining Pilot Test
  Direct Combustion Test on Pre-Atomized Fuels
    Furnace Assembly and Instrumentation
    Preparation of Pre-Atomized Fuel for Combustion Test
    Combustion Test Procedure
    Results of Preliminary Combustion Test
    Results of Combustion Emissions Test

INTRODUCTION

This invention relates to the utilization of highly viscous hydrocarbons, including heavy crude oils and residual oils. More particularly, this invention relates to the transportation of viscous hydrocarbons through the formation of low-viscosity bioemulsifier-stabilized hydrocarbon-in-water emulsions, or hydrocarbosols, in which the hydrocarbon droplets dispersed in the continuous aqueous phase are substantially stabilized from coalescence by the presence of bioemulsifiers and in particular, microbial bioemulsifiers, surrounding the droplets at the hydrocarbon/water interface. Furthermore, this invention relates to the combustion of pre-atomized fuels which include both hydrocarbosols and other viscous hydrocarbon-in-water emulsions.

Transportation of highly viscous hydrocarbons via conventional pipelines or other methods, including tankers and barges, presently cannot be accomplished practically without reduction of the viscosity of the hydrocarbons to put them into a pumpable form. This invention presents an alternative means to viscosity reduction, potentially more economical than methods requiring heating or dilution with lighter petroleum stocks. Formation of hydrocarbon-in-water emulsions effectively reduces the viscosity of heavy hydrocarbon materials, thereby facilitating shipping and pumping with conventional equipment, as well as in situ handling. Furthermore, the pre-atomized fuels formed by the methods of this invention can be burned directly by conventional means, without de-watering or demulsification, potentially resulting in emissions reductions.

Under circumstances where transportation distances from production location to utilization sites are considerable, giving rise to long transit times and/or the potential for shutdowns en route, or where long storage periods are required, the use of hydrocarbosols is especially advantageous. Because the microbial bioemulsifiers predominantly reside at the hydrocarbon/water interface, essentially covering the surface of the hydrocarbon droplets, the hydrocarbon droplets are effectively protected from coalescence and the reduced viscosity of the hydrocarbosols is effectively maintained over time. The substantial stability and improved pumpability of the hydrocarbosols allows them to be transported practically over long distances or remain stationary for long periods of time prior to utilization.

BACKGROUND OF THE INVENTION

VISCOUS HYDROCARBONS

While large quantities of high-quality, relatively inexpensive, light crude oils presently are recoverable from world-wide geographical locations, ever-increasing consumption of petroleum fuels and other petroleum products and the energy crisis precipitated by such high demands have brought interest to bear on the enormous reserves of low-gravity, viscous hydrocarbons which also exist throughout the world. Viscous hydrocarbons present in natural deposits have been generally classified as viscous crude oils, bitumen or tar and have been variously called heavy crudes, native bitumen, natural bitumen, oil sands, tar sands, bituminous sands or deposits and natural asphalts, all of which materials are chemically gradational and nearly indistinguishable without standardized analyses. [For a discussion of the general characteristics of viscous hydrocarbons and the problem of precisely defining or classifying them, see Meyer, "Introduction" in: The Future of Heavy Crude and Tar Sands, p. 1, Mining Informational Services, McGraw Hill, Inc., New York (1981). See also Section 6.2 infra.]

The geographical distribution of heavy crude reserves is given in Table I [abstracted from Meyer and Dietzman (1981), "World Geography of Heavy Crude Oils," in: The Future of Heavy Crude and Tar Sands, pp. 16–28, Mining Informational Services, McGraw Hill, Inc., New York (1981)]. The total estimated figure for oil in place is $6200 \times 10^9$ barrels. Venezuela heads the list with roughly half of this total, $3000 \times 10^9$ barrels. Canada follows closely with $2950 \times 10^9$ barrels (this total includes hydrocarbon in bitumen), while the United States has an estimated $77 \times 10^9$ barrels. To put these figures in perspective, the total world reserves of oil lighter than 20° API is estimated to be about $660 \times 10^9$ barrels. Yet undiscovered reserves are estimated at $900 \times 10^9$ barrels. Thus, heavy crude is more plentiful than conventional oil by about a factor of four. Further considering the amount of heavy residual oils that result from the processing of conventional crudes, the amount of heavy oils that exists worldwide is very great indeed.

TABLE I
WORLD HEAVY OIL DEPOSITS
(Billions of Barrels)

| Country | Resource In-Place | Estimated Recoverable |
|---|---|---|
| Venezuela | 3000 | 500 |
| Canada | 2950 | 213 |
| United States | 77 | 30 |
| Italy | 12 | 1 |
| Madagascar | 25 | 1 |
| Iran | 29 | 3 |
| Iraq | 10 | 1 |

It is clear that reserves of conventional light crudes are being depleted much faster than heavy crudes and that development of world reserves of viscous hydrocarbons will eventually become necessary to support world petroleum demands. Significant production of heavy crudes has begun, primarily by steam-assisted enhanced recovery methods. For example, recent estimates place production of heavy crude oil in California at 250,000 barrels per day. Future estimates [Barnea, "The Future of Heavy Crude and Tar Sands," in: The Future of Heavy Crude and Tar Sands, pp. 13–15, Mining Informational Services, McGraw Hill, Inc., New York (1981)] project that by the year 2000, production of heavy oil plus the bitumen from tar sands will increase to one-third of the world's total oil production. Such rapid development of heavy oil resources will extend the petroleum era and should: (1) allow products from heavy crudes to benefit from the existing energy infrastructure; (2) assure fuel supplies to the transportation sector and feed-stock to petrochemical plants; (3) be a stabilizing factor for world petroleum prices, increasing the number of oil producing countries; (4) reduce the strategic and political aspects of oil production; and (5) postpone the need for massive investments in coal conversion and other facilities for synthetic oil production.

TRANSPORTATION OF VISCOUS HYDROCARBONS

The problem of transporting viscous hydrocarbons, be it out of a producing well, off a tanker or, especially, through a pipeline, is one of pumpability. Consequently, methods for transporting viscous hydrocarbons such as heavy crude oils have focused on modifying the oil into a pumpable form. Two general approaches have been considered. For waxy crudes, it is desirable to transport the oil above its pour point, i.e., above the temperature at which wax crystals in the oil inhibit its ability to flow. One method directed to this end is the use of pour-point depressants to reduce the pour point and maintain fluidity. Generally, this method is of value only with those oils of sufficiently low viscosities to permit transportation at ambient temperatures.

For highly viscous crudes, the approach taken has been to reduce the viscosity. When the crude is to be transported by pipeline, the viscosity must be sufficiently reduced to flow through conventional lines using conventional pumping equipment. Several methods have been used to reduce the viscosities of heavy crude oils for pipelining purposes. These methods include preparation of oil/solid slurries, mixing water with oil to form reduced viscosity emulsions, heating the oil to lower its viscosity and diluting the oil with low viscosity hydrocarbons such as condensate, gasoline, or naphtha [Sloan et al., "Pipeline Transportation of Heavy Oils," in: The Future of Heavy Crude and Tar Sands, pp. 719–726, Mining Informational Services, McGraw-Hill, Inc. New York (1981)].

Reported methods for reducing the viscosities of viscous hydrocarbons by forming oil-in-water emulsions for the purposes of transporting them through pipelines or pumping them from wells have involved the use of chemical additives. Among the chemicals which have been proposed or used are bases such as sodium hydroxide or ammonia [U.S. Pat. Nos. 3,380,531; 3,487,844; and 3,006,354], nonionic surfactants [U.S. Pat. Nos. 3,425,429 and 3,467,195] and combinations of nonionic and anionic surfactants [U.S. Pat. Nos. 4,239,052 and 4,249,554]. Instability of oil-in-water emulsions can present a problem; for instance, oil-in-water emulsions are known to break or invert into unpumpable forms. Increasing the amount of chemicals used to maintain stability can result in prohibitive costs.

It is notable that in a recent review of methods for pipelining heavy crude oils (see Sloan et al.; supra) it was pointed out that there have been limited, if any, commercial applications of the emulsion approach to pipelining. It is also noteworthy that Sloan et al. concluded that the heating and dilution methods for reducing viscosity, despite the fact that they are energy-intensive and relatively costly, remain the major candidates for pipelining transport of heavy crude oils.

COMBUSTION OF OIL-IN-WATER EMULSIONS

The vast majority of combustible emulsions known in the art are water-in-oil emulsions, primarily consisting of relatively small amounts of water (1–10% by volume) in oil to enhance combustion. Some combustible oil-in-water emulsions have been described [see e.g., U.S. Pat. Nos. 3,958,915; 4,273,611 and 4,382,802]. Notably, however, the oil phases used have been light, low viscosity fuels and other low viscosity oils, e.g., kerosene, gasoline, gas oil, fuel oils and other oils which are liquid at room temperature. Combustible thixotropic jet fuels and other safety fuels have been described in U.S. Pat. Nos. 3,352,109; 3,490,237 and 4,084,940. Under resting (stationary) conditions, these oil-in-water emulsions are in the form of gels with apparent rest viscosities of 1000 cps and preferably 50,000–100,000 cps. These thixotropic oil-in-water emulsions exhibit low viscosities under high pumping (high shear) rates.

MICROBIAL SURFACE ACTIVE COMPOUNDS

Many microbes can utilize hydrocarbon as their sole source of carbon for growth and energy production. The hydrocarbon substrates may be linear, branched, cyclic or aromatic. In order to rapidly assimilate such water-insoluble substrates, the microbes require a large contact area between themselves and the oil. This is achieved by emulsifying the oil in the surrounding aqueous medium. Hydrocarbon degrading microbes frequently synthesize and excrete surface active agents which promote such emulsification.

For example, the growth of *Mycobacterium rhodochrous* NCIB 9905 on n-decane yields a surface active agent which was reported by R. S. Holdom et al. [J. Appl. Bacteriol. 32, 448 (1969)] to be a nonionic detergent. J. Iguichi et al. [Agric. Biol. Chem., 33, 1657 (1969)] found that *Candida petrophilium* produced a surface active agent composed of peptides and fatty acid moieties, while T. Suzuki et al. [Agric. Biol. Chem., 33, 1919 (1969)] found trehalose lipid in the oil phase of culture broths of various strains of Arthrobacter, Brevibacterium, Corynebacterium and Nocardia. Wagner has reported the production of trehalose lipids by *Nocardia rhodochrous* and *Mycobacterium phlei* and their use in oil recovery [U.S. Pat. Nos. 4,392,892 and 4,286,660].

*Torulopsis gropengiesseri* was found to produce a sophorose lipid, while rhamnolipids are reported by K. Hisatsuka et al. [Agric. Biol. Chem., 35, 686 (1971)] to have been produced by *Pseudomonas aeruginosa* strain S7B1 and by S. Itoh et al. [Agric. Biol. Chem., 36, 2233 (1971)] to have been produced by another *P. aeruginosa* strain, KY4025. The growth of *Corynebacterium hydrocarboclastus* on kerosene was reported by J. E. Zajic and his associates [Dev. Ind. Microbiol., 12, 87 (1971); Biotechnol. Bioeng., 14, 331 (1972); Chemosphere 1, 51 (1972); Crit. Rev. Microbiol., 5, 39; U.S. Pat. No. 3,997,398] to produce an extracellular heteropolysaccharide which, among other properties, emulsified kerosene, Bunker C fuel oil and other fuel oils.

Gutnick et al. discovered that *Acinetobacter calcoaceticus* ATCC 31012 (previously designated Acinetobacter sp. ATCC 31012 and also called RAG-1) produces interfacially active extracellular protein-associated lipopolysaccharide biopolymers called emulsans. These biopolymers are produced and build up as a capsule or outer layer around the bacterial cell during growth and are eventually released or sloughed off into the medium, from which they can be harvested as extracellular products. *Acinetobacter calcoaceticus* ATCC 31012 produces α-emulsans when grown on ethanol or fatty acid salts [U.S. Pat. Nos. 4,230,801; 4,234,689 and 4,395,354] and β-emulsans when grown on crude oil or hexadecane [U.S. Pat. No. 3,941,692]. The α-emulsans and β-emulsans can be derivatized to an O-deacylated form called psi-emulsans [U.S. Pat. No. 4,380,504]. The α-emulsans, β-emulsans and psi-emulsans can be deproteinized to yield apo-α-emulsans, apo-β-emulsans and apo-psi-emulsans, respectively [U.S. Pat. Nos. 4,311,830; 4,311,829 and 4,311,831, respectively].

Cooper and Zajic [Adv. Appl. Microbiol. 26:229–253 (1980)] have reviewed the production of surface active compounds by microorganisms. Some of the surface active agents described are listed in Table II.

TABLE II

MICROBIAL SURFACE ACTIVE COMPOUNDS

| STRUCTURAL TYPE | PRODUCING MICROORGANISM(S) |
| --- | --- |
| Carbohydrates-Lipids | |
| Trehalose-Lipids | Nocardia, Mycobacterium, Corynebacterium, Arthrobacter |
| Rhamnose-Lipids | Pseudomonas aeruginosa |
| Sophorose-Lipids | Torulopsis spp. |
| Polysaccharide-Lipid | Candida tropicalis, Acinetobacter calcoaceticus |
| Amino Acid-Lipids | |
| Lipopeptides | Bacillus, Streptomyces, Corynebacterium, Mycobacterium |
| Ornithine-Lipids | Pseudomonas, Thiobacillus, Agrobacterium, Gluconobacter |
| Phospholipids | Thiobacillus, Corynebacterium, Candida, Micrococcus |
| Fatty Acids/Neutral Lipids | Pseudomonas, Mycococcus, Penicillium, Aspergillus, Acinetobacter, Micrococcus, Candida |

SUMMARY OF THE INVENTION

This invention provides novel compositions and methods for manipulating viscous hydrocarbons including highly viscous crude and residual oils, generally characterized by API gravities of about 20° API or less, viscosities of about 100 centipoise or greater at 150° F., paraffin contents of about 50% by weight or less, and aromatic contents of about 15% or greater by weight, into an emulsified form which (a) can be stored in facilities or transported by methods presently used to handle less viscous materials and (b) can be burned directly as quality combustible fuels. In an embodiment preferred for transportation purposes, the emulsified form of the viscous hydrocarbon is a hydrocarbosol defined as a bioemulsifer-stabilized hydrocarbon-in-water emulsion wherein the individual hydrocarbon droplets are essentially covered by water-soluble bioemulsifier molecules predominantly residing at the hydrocarbon/water interface, which bioemulsifier molecules form an effective barrier against droplet coalescence and hence promote the maintenance of discrete hydrocarbon droplets dispersed in a continuous, low-viscosity aqueous phase. The hydrocarbosols of this invention have viscosities reduced by at least a factor of about 10 and preferably at least $10^2$ compared to that of the viscous hydrocarbon starting material, said hydrocarbosol viscosities remaining so reduced under static conditions for periods of at least about 1 day, and preferably at least about 30 days.

Surfactant packages for forming hydrocarbosols are provided which comprise a water-soluble chemical surfactant, or a combination of water-soluble chemical and/or biological co-surfactants, preferably nonionic and anionic surfactants, together with a bioemulsifier which, because of any number of characteristics including, but not limited to, high molecular weight, highly specific three-dimensional structure, hydrophobic and hydrophilic nature, polymeric nature and/or sparing solubility in hydrocarbons, binds tightly to the hydrocarbon/water interface and essentially covers the surface of individual hydrocarbon droplets in hydrocarbon-in-water emulsions, effectively maintaining discrete droplets and preventing coalescence and imparting substantial stability to hydrocarbon-in-water emulsions.

Methods are provided for transporting viscous hydrocarbons wherein a surfactant package is used in a proportion from about 1:100 to about 1:20,000 based on oil to form a hydrocarbosol containing up to about 90% by volume of hydrocarbon in an aqueous phase variously comprising deionized water, municipal water, brines or alcohol/water mixtures, which hydrocarbosol can be shipped by conventional means or pumped through conventional, non-heated pipelines.

Methods are also provided for utilizing viscous hydrocarbons by forming pre-atomized fuels, i.e., hydrocarbosol fuels or hydrocarbon-in-water emulsion fuels and burning them in conventional combustion facilities.

NOMENCLATURE

The term "hydrocarbosol" is defined as any bioemulsifier-stabilized hydrocarbon-in-water emulsion wherein the individual hydrocarbon droplets are essentially surrounded or covered by water-soluble bioemulsifier molecules predominantly residing at the hydrocarbon/water interface, which bioemulsifier molecules form an effective barrier against droplet coalescence and hence promote the maintenance of discrete hydrocarbon droplets suspended or dispersed in the continuous, low-viscosity aqueous phase.

The term "water-soluble" is defined to include water-dispersible substances.

The term "viscous hydrocarbon" is defined as any naturally occurring crude oil or any residual oil remaining after refining operations which is generally characterized by a viscosity of about $10^2$–$10^6$ centipoise or greater and otherwise generally, but not necessarily, characterized by an API gravity of about 20° API or less, high metal content, high sulfur content, high asphaltene content and/or high pour point. The term "viscous hydrocarbon," it is to be understood, also encompasses the following nomenclature: vacuum residuals, vis-breaker residuals, catalytic-cracker residuals, catalytic hydrogenated residuals, coker residuals, ROSE (residual oil supercritical extraction) residuals, tars and cut-back tars, bitumen, pitch and any other terms describing residuals of hydrocarbon processing.

The term "pre-atomized fuel" is defined as any hydrocarbosol and any viscous hydrocarbon-in-water emulsion formed by methods described herein for use as a combustible fuel.

The term "bioemulsifier" is defined as any biologically derived substance which, by virtue of any combination of characteristics including, but not limited to, high molecular weight, polymeric nature, highly specific three-dimensional structure, hydrophobic and hydrophilic moieties and sparing solubility in hydrocarbons, binds tightly to the hydrocarbon/water interface and essentially covers the surface of individual hydrocarbon droplets in hydrocarbon-in-water emulsions, effectively maintaining discrete droplets and preventing coalescence, and thereby imparting substantial stability to hydrocarbon-in-water emulsions. An example of a bioemulsifier is α-emulsan.

The term "biosurfactant" is defined as any biologically derived substance which reduces the interfacial tension between water and a hydrocarbon and, as a result, reduces the energy requirement (mixing energy) for creation of additional interfacial area. An example of a biosurfactant is a glycolipid.

The term "surfactant package" is defined as any composition useful for forming hydrocarbon-in-water emulsions of viscous hydrocarbons generally characterized by a paraffin content of about 50% by weight or less and an aromatic content of about 15% by weight or greater with viscosities of about 100 centipoise or greater at 150° F., which composition may comprise a chemical surfactant or a combination of chemical co-surfactants or a combination of co-surfactant(s) and biosurfactant(s) or a combination of chemical surfactant(s) and bioemulsifier(s) or a combination of chemical surfactant(s), biosurfactant(s) and bioemulsifier(s), and which may also include chemical emulsion stabilizers, and which may be in aqueous form.

The term "emulsans," which reflects the polysaccharide structure of these compounds and the exceptional bioemulsifier activity of these materials, generically identifies those capsular/extracellular microbial protein-associated lipoheteropolysaccharides produced by *Acinetobacter calcoaceticus* ATCC 31012 and its derivatives or mutants, which may be subdivided into the α-emulsans and the β-emulsans. The name "apoemulsan" generically identifies those deproteinized lipopolysaccharides obtained from the emulsans.

The term "α-emulsans" defines those extracellular microbial protein-associated lipopolysaccharides produced by *Acinetobacter calcoaceticus* ATCC 31012 and its derivatives or mutants in which the lipopolysaccharide components (i.e., without the associated protein) are completely N-acylated and partially O-acylated heteropolysaccharides made up of major amounts of D-galactosamine and an aminouronic acid, the lipopolysaccharide components containing at least 5 percent by weight of fatty acid esters in which (1) the fatty acids contain from about 10 to about 18 carbon atoms; and (2) about 50 percent by weight or more of such fatty acids are composed of 2-hydroxydodecanoic acid and 3-hydroxydodecanoic acid. It follows, therefore, that the deproteinized α-emulsan are called "apo-α-emulsans."

The term "β-emulsans" defines those extracellular microbial protein-associated lipopolysaccharides produced by *Acinetobacter calcoaceticus* ATCC 31012 and its mutants in which the lipopolysaccharide components (i.e., without the associated protein) are completely N-acylated and partially O-acylated heteropolysaccharides made up of major amounts of D-galactosamine and an aminouronic acid, the lipopolysaccharide components containing less than 5 percent by weight of fatty acid esters in which (1) the fatty acids contain from about 10 to about 18 carbon atoms; and (2) less than 50 percent by weight of such fatty acids are composed of 2-hydroxydodecanoic acid. The deproteinized β-emulsans are called "apo-β-emulsans."

The term "psi-emulsans" defines the O-deacylated extracellular protein-associated microbial polysaccharides obtained from the emulsans, the protein-free components of such psi-emulsans being completely N-acylated heteropolysaccharides made up of major amounts of D-galactosamine and an aminouronic acid and containing from 0 to 1 percent of fatty acid esters in which, when present, the fatty acids contain from about 10 to about 18 carbon atoms. These protein-free components are called "apo-psi-emulsans," regardless of how they are prepared.

The term "polyanionic heteropolysaccharide biopolymers" defines those biopolymers in which (a) substantially all of the sugar moieties are N-acylated aminosugars, a portion of which is N-acylated-D-galactosamine and another portion of which is N-acylated aminouronic acid, a part of the N-acyl groups of such heteropolyschardide being N-3-hydroxydodecanoyl groups; and (b) at least 0.2 micromoles per milligram of such heteropolysaccharide consist of fatty acid esters in which (1) the fatty acids contain about 10 to about 18 carbon atoms and (2) about 50 percent by weight or higher of such fatty acids are composed of 2-hydroxydodecanoic acid and 3-hydroxydodecanoic acid.

DETAILED DESCRIPTION OF THE INVENTION

SURFACTANT PACKAGES

Figure 1:
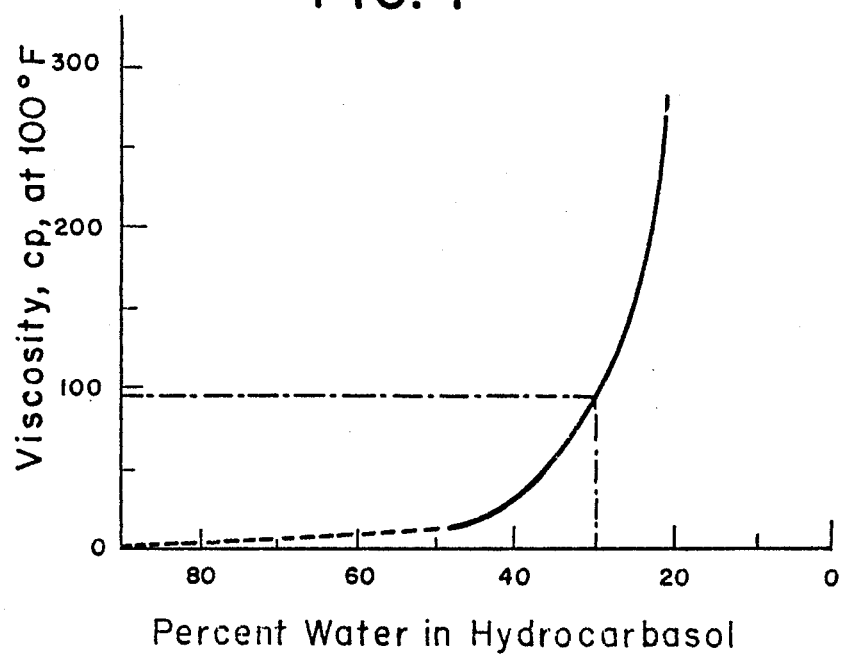
FIG. 1 is a graphical representation of the viscosity versus water content profile of emulsan-stabilized hydrocarbosols formulated with Boscan crude oil, wherein the dashed line (at 30% water) indicates near-optimum operating conditions.

The surfactant packages of this invention can be formulated with a wide variety of chemical and microbial surface active agents and are preferably formulated with water-soluble surface active agents to provide for the formation of oil-in-water, as opposed to water-in-oil, emulsions. The surfactant packages can be formulated with numerous chemical surfactants, used alone or in conjunction with chemical co-surfactants of the same type (e.g., a combination of water-soluble nonionic surfactants) or of different types (e.g., a combination of water-soluble nonionic, anionic, cationic and/or amphoteric surfactants), and can be further formulated in combination with (a) a water-soluble biosurfactant or combination of biosurfactants as co-surfactant(s) and/or (b) a water-soluble bioemulsifier or combination of bioemulsifiers as emulsion stabilizer(s). In certain instances, chemical emulsion stabilizers may also be used in place of bioemulsifiers. It is also possible to formulate surfactant packages comprising only microbial surface active agents, i.e., combinations of biosurfactants and bioemulsifiers. The surfactant packages of this invention vary with the type of viscous oil to be emulsified. The following general compositions are offered by way of illustration. For viscous crudes, surfactant packages can be formulated to comprise at least one chemical surfactant and at least one bioemulsifier. They can also be formulated to comprise at least one water-soluble nonionic surfactant, at least one water-soluble anionic surfactant, and at least one bioemulsifier. For viscous residuals, surfactant packages can be formulated to comprise at least one water-soluble non-ionic surfactant or at least one anionic surfactant or combinations of non-ionic surfactants and anionic surfactants and which can further comprise biosurfactants and/or bioemulsifiers.

The types of water-soluble nonionic chemical surfactants suitable for use in the surfactant packages are listed in Table III.

TABLE III

CLASSES AND SUBCLASSES OF NONIONIC CHEMICAL SURFACTANTS

Alcohols, ethoxylated
Alkylphenols, ethoxyulated
Carboxylic Esters, ethoxylated
   Glycerol Esters
   Polyethylene Glycol Esters
   Anhydrosorbitol Esters
   Ethoxylated Anhydrosorbitol and Sorbitol Esters
   Natural Fats and Oils, ethoxylated
   Ethylene and Diethylene Glycol Esters
   Propanediol Esters
   Other Carboxylic Acid Esters
Carboxylic Amides, Ethoxylated
Amines, polyoxyalkylated In surfactant packages for viscous crudes, the preferred water-soluble nonionic chemical surfactants are ethoxylated alkyl phenols and ethoxylated alcohols. In surfactant packages for viscous residuals, the preferred water-soluble nonionic surfactants are, again, ethoxylated alkyl phenols and also polyoxyalkylated amines.

The ethoxylated alkyl phenols are of the general formula:

$$R_xC_6H_4(OC_2H_4)_nOH$$

wherein R represents an alkyl group containing from about 8 to about 12 carbon atoms (i.e., about $C_8$ to about $C_{12}$), x represents the number of alkyl groups and is either 1 or 2, and wherein n represents the number of ethoxy groups (moles ethylene oxide) which can range from about 1 to about 100. [For a list of commercially available ethoxylated alkylphenols, see "Surfactants and Detersive Systems" in: Encyclopedia of Chemical Technology, Kirk-Othmer (Third Edition), Volume 22, pp. 366–367, John Wiley & Sons, New York (1983).] In surfactant packages for viscous crudes, preferred ethoxylated alkyl phenols are those having R groups of 8 or 9 carbon atoms and having from about 7 to about 100 ethoxy groups. An example of a particularly preferred ethoxylated alkyl phenol is monononylphenol with about 40 ethoxy groups. In surfactant packages for viscous residuals, preferred ethoxylated alkyl phenols are those having alkyl groups of 8 or 9 carbon atoms and having from about 9 to about 70 ethoxy groups. An example of a particularly preferred ethoxylated alkyl phenol for use with viscous residuals in monooctylphenol with about 16 ethoxy groups.

The ethoxylated alcohols are of the the general formula:

$$R(OC_2H_4)_nOH$$

wherein R represents an aliphatic group (linear or branched) containing from about 6 to about 18 carbon atoms and wherein n represents the number of ethoxy groups which can range from about 2 to about 100. For a list of commercially available ethoxylated alcohols, see "Surfactants and Detersive Systems" in: Encyclopedia of Chemical Technology, supra, pp. 364–365.) Examples of ethoxylated alcohols include ethoxylated trimethylnonanols with about 3 to about 9 ethoxy groups and ethoxylated secondary alcohols having R groups of about 11 to about 15 carbon atoms with about 3 to about 30 ethoxy groups, but preferably greater than about 7 ethoxy groups.

The polyoxyalkylated amines are of the general formula:

$$R_xN_y(CH_3)_2$$

wherein R represents an oxyalkyl group containing either 2 or 3 carbon atoms. These R groups can range in number from about 4 to about 500, and that number is represented by x. The number of nitrogen atoms is represented by y and preferably ranges from about 1 to about 2; the alkyl group is preferably ethyl ($C_2H_4$). Preferred polyoxyalkylated amines are those having R groups of 2 or 3 carbon atoms and having from about 50 to about 450 oxyalkyl groups. An example of a particularly preferred polyoxyalkylated amine is a polyoxyalkylated diamine with about 50 ethoxy groups and about 60 propoxy groups.

The types of water-soluble anionic chemical surfactants suitable for use in the surfactant packages of this invention are listed in Table IV.

TABLE IV
CLASSES AND SUBCLASSES OF ANIONIC
CHEMICAL SURFACTANTS

Carboxylic Acids and Salts
Sulfonic Acids and Salts
  Lignosulfonates
  Alkylbenzenesulfonates
  Alkylbenzenesulfonates, polymerized
  Alkylarylsulfonates, short chain
  Alkylarylsulfonates, polymerized
  Naphthalenesulfonates
  Alkylnaphthalenesulfonates, polymerized
  Naphthalene/formaldehyde condensate polymers
  Petroleum Sulfonates
  Sulfonates with ester, ether, or amide linkages (dialkyl sulfosuccinates)
  Other Sulfonates
Sulfuric Acid Esters and Salts
  Alcohols, sulfated
  Alcohols, ethoxylated and sulfated
  Alkylphenols, ethoxylated and/or sulfated
  Acids, Amides, and Esters, sulfated
  Natural Fats and Oils, sulfated
Phosphoric and Polyphosphoric Acid Esters (and Salts)
  Alcohols and Phenols, alkoxylated and phosphated (and their salts)
  Other Phosphoric and Polyphosphoric Acid Esters (and their salts)
  Carboxylic Acid Esters In surfactant packages for both viscous crudes and viscous residuals, the preferred water-soluble anionic chemical surfactants are sulfonated or sulfated forms of nonionic surfactants. In surfactant packages for viscous crudes, ethoxylated alcohol sulfates are preferred. In surfactant packages for viscous residuals, sulfonated or sulfated ethoxylated alkylphenols and ethoxylated alcohol sulfates are preferred. In surfactant packages for both viscous crudes and viscous residuals, alkylaryl sulfonates are also preferred anionic chemical surfactants. The ethoxylated and sulfated alcohols are of the general formula:

$$R(OC_2H_4)_nOSO_3M$$

wherein R represents an aliphatic group containing from about 6 to about 16 carbon atoms, preferably from about 12 to about 14, n represents the number of ethoxy groups which can range from about 1 to about 4, preferably from about 2 to about 3, and M includes, but is not limited to, ammonium ($NH_4$), sodium (Na), potassium (K), calcium (Ca) or triethanolamine, preferably ammonium. [For a list of commercially available ethoxylated alcohol sulfates, see "Surfactants and Detersive Systems" in: Encyclopedia of Chemical Technology, supra, p. 357.] The alcohol moiety of the ethoxylated alcohol sulfate can be an even or odd number or mixture thereof. In surfactant packages for viscous crudes, an example of a particularly preferred ethoxylated alcohol sulfate is poly(3)ethox $C_{12}$–$C_{14}$ linear primary alcohol sulfate, ammonium salt. It is also possible to use nonethoxylated alcohol sulfates, i e , alcohol sulfates of the formula $R(OC_2H_4)_nOSO_3M$ as described supra but wherein n=0. In surfactant packages for viscous residuals, an example of a particularly preferred nonethoxylated alcohol sulfate is the sodium salt of a sulfated lauryl alcohol.

The sulfated ethoxylated alkylphenols are of the general formula:

$$RC_6H_4(OC_2H_4)_nOSO_3M$$

wherein R represents an aliphatic group containing at least about 8 or 9 carbon atoms, n represents the number of ethoxy groups which can range from about 1 to about 100, preferably from about 4 to about 9 and M includes, but is not limited to, ammonium ($NH_4^+$), sodium ($Na^+$), potassium ($K^+$) and calcium ($Ca^{++}$) or triethanolamine (TEA), preferably ammonium.

An example of a particularly preferred sulfated ethoxylated alkylphenol is the ammonium salt of a sulfated nonylphenol ethoxylate containing, but not limited to, about 4 ethoxy groups.

The alkylaryl sulfonates are of the general formula:

$$R_nAr_m(SO_3)_xM$$

wherein Ar is an aromatic group which is benzyl, naphthyl, phenyl, tolyl, xylyl or ethylphenyl, R is a linear or branched chain alkyl group containing from about 2 to about 16 carbon atoms, n is 1 or 2, m is 1 or greater, x is at least about 1, and M includes, but is not limited to, ammonium, sodium, potassium, calcium or triethanolamine. [For a list of commercially available alkylaryl sulfonates, see "Surfactants and Detersive Systems" in: Encyclopedia of Chemical Technology, supra, p. 358.] An example of an alkylaryl sulfonate is a modified amine dodecylbenzene sulfonate. In surfactant packages for viscous residuals, an example of a particularly preferred alkylaryl sulfonate is the sodium salt of polymerized alkylnaphthalene sulfonate.

The preferred water-soluble microbial surface active agents for use in the surfactant packages of this invention are any microbial or other biologically-derived substances which function as bioemulsifiers, i.e., substances which, by virtue of such characteristics as large molecular weight, polymeric nature, highly specific three-dimensional structure, hydrophobic and hydrophilic nature, and sparing solubility in oil, effectively cover the oil/water interface maintaining discrete, individual oil droplets in oil-in-water emulsions thereby substantially stabilizing emulsions from coalescence. Among the preferred bioemulsifiers are heteropolysaccharide biopolymers produced by bacteria of the genus Acinetobacter and the genus Arthrobacter, and in particular, those produced by strains of *Acinetobacter calcoaceticus*. Such Acinetobacter heteropolysaccharide biopolymers include, but are not limited to, polyanionic heteropolysaccharide biopolymers, α-emulsans, β-emulsans, psi-emulsans, apo-α-emulsans, apo-β-emulsans and apo-psi-emulsans produced by *Acinetobacter calcoaceticus* ATCC 31012 (deposited at the American Type Culture Collection in Rockville, Md.) defined in Section 4 and described in U.S. Pat. Nos. 4,395,365; 4,395,354; 3,941,692; 4,380,504; 4,311,830; 4,311,829; and 4,311,831, respectively (hereby incorporated by reference). Other *Acinetobacter calcoaceticus* materials that can be used are the products of strains NS-1 (NRRL B-15847), NS-4 (NRRL B-15848), NS-5 (NRRL B-15849), NS-6 (NRRL B-15860) and NS-7 (NRRL B-15850). The foregoing "NS" strains have been deposited at the Northern Regional Research Center in Peoria, Ill. and have been assigned the foregoing NRRL accession numbers. the "NS" strains of *Acinetobacter calcoaceticus* are described by Sar and Rosenberg, Current Microbiol. 9(6):309–314 (1983), hereby incorporated by reference. Other Acinetobacter heteropolysaccharide biopolymers are those produced by *Acinetobacter calcoaceticus* BD4 [Taylor and Juni, J. Bacteriol. 81: 688–693 (1961), hereby incorporated by reference]. Particularly preferred Acinetobacter heteropolysaccharide biopolymers are the α-emulsans, the production of which is further described in U.S. Pat. Nos. 4,230,801 and 4,234,689 (hereby incorporated by reference). The α-emulsans are characterized by a Specific Emulsification Activity of about 200 units per milligram or higher, where one unit per milligram of Specific Emulsification Activity is defined as that amount of emulsifying activity per milligram of bioemulsifier which yields 100 Klett absorption units using a standard hydrocarbon mixture consisting of 0.1 ml of 1:1 (v/v) hexadecane/2-methylnaphthalene and 7.5 ml of Tris-Magnesium buffer.

The foregoing Acinetobacter bioemulsifiers can be used in the surfactant packages of this invention in a variety of forms including, but not limited to, post-fermentation whole broth; cell-free (Millipore-filtered, e.g.) or partially cell-free supernatants of post-fermentation culture broth; the cells themselves; protease-treated, liquid or dried materials; and protease-treated, ultrafiltered, liquid or dried materials.

Numerous other microbial organisms may possibly serve as a source of biological surface active agents, including biosurfactants and bioemulsifiers, for use in the surfactant packages of this invention. Some of these microorganisms and the types of compounds they produce are listed in Table V, though the list is not exhaustive. The surfactant packages of this invention may also be formulated with water-soluble cationic chemical surfactants, including, but not limited to, oxygen-free amines, oxygen-containing amines, amide-linked amines and quaternary ammonium salts. Use of cationic chemical surfactants in conjunction with microbial surface active agents would require that the charge characteristic of the biological compounds be considered. For example, cationic chemical surfactants would probably best be used in conjunction with neutral microbial surface active agents and would probably best not be used in conjunction with the preferred polyanionic heteropolysaccharide bioemulsifiers.

TABLE V

| MICROBIAL SURFACE ACTIVE AGENTS | |
| --- | --- |
| Microbial Compound | Microbial Source |
| Carbohydrate-containing surface active agents | |
| Trehalose lipids | Arthrobacter spp. |
| | *Arthrobacter paraffineus* KY4303 |
| | Mycobacterium spp. |
| | *Mycobacterium smegmatis* |
| | *Mycobacterium kansasii* |
| | *Mycobacterium tuberculosis* |
| | *Mycobacterium phlei* |
| | *Mycobacterium rhodochrous* |
| | *Mycobacterium fortuitum* |
| | Nocardia spp. |
| | *Nocardia asteroides* |
| | *Nocardia rhodochrous* |
| | Corynebacterium spp. |
| | *Corynebacterium diphtheriae* |
| | Brevibacterium |
| Rhamnolipids | *Arthrobacter paraffineus* |
| | *Pseudomonas aeruginosa* |
| Sophorose lipids | Torulopsis spp. |
| | *Torulopsis magnoliae* |
| | *Torulopsis gropengiesseri* |
| Diglycosyl | *Lactobacillus fermenti* |

TABLE V-continued
MICROBIAL SURFACE ACTIVE AGENTS

| Microbial Compound | Microbial Source |
|---|---|
| diglycerides | |
| Polysaccharide-lipid complexes | Arthrobacter spp. |
| Amino acid-containing surface active agents | Candida tropicalis |
| Lipopeptides | Bacillus subtilis |
| | Bacillus mesentericus |
| | Candida petrophilum |
| | Streptomyces canus |
| | Corynebacterium lepus |
| | Nocardia asteroides |
| | Mycobactrium paratuberculosis |
| | Mycobacterium fortuitum |
| Ornithine lipids | Pseudomonas rubescens |
| | Thiobacillus thioxidans |
| | Agrobacterium tumefaciens |
| | Gluconobacter cerinus |
| Protein | Pseudomonas aeruginosa |
| Phospholipids | Thiobacillus thiooxidans |
| | Corynebacterium lepus |
| | Corynebacterium alkanolyticum |
| | Candida tropiclis |
| | Micrococcus cerificans |
| Fatty acids and Neutral lipids | |
| Carboxylic acids | Corynbacterium lepus |
| | Pseudomonas spp. |
| | Mycococcus spp. |
| | Penicillium spp. |
| | Aspergillus spp. |
| | Acinetobacter spp. |
| | Micrococcus cerificans |
| | Candida cloacae |
| Neutral lipids and mixtures of fatty acids | Mycobacterium rhodochrous |
| | Arthrobacter paraffineus |
| | Arthrobacter paraffineus ATCC 19558 |
| | Mycobacterium lacticolum |
| | Acinetobacter spp. |
| | Thiobacillus thiooxidans |
| Polysaccharides | |
| Heteropolysaccharides | Xanthomonas campestris |
| | Xanthomonas campestris NRRL B1459 |
| | Arthrobacter viscosus |
| | Arthrobacter viccosus NRRL B1973 |
| | Methylomonas spp. |
| Homopolysaccharides | Lactobacillus spp. |
| | Methylomonas mucosa NRRL B5696 |
| Lipopolysaccharides | Acinetobacter calcoaceticus |
| | Acinetobacter calcoaceticus ATCC 31012 |
| | Pseudomonas fluorescens |
| | Yersinia pseudotuberculosis |
| | Yersinia pestis |
| | S. calcoaceticus |
| Other Surface Active agents | |
| unknown or poorly characterized | Pseudomonas spp. |
| | Pseudomonas aeruginosa |
| | Pseudomonas oleororans |
| | Pseudomonas putida |
| | Pseudomonas desmolyticam |
| | Pseudomonas methanica |
| | Corynebacterium spp. |
| | Corynebacterium sp. ATCC 21235 |
| | Corynebacterium hydrocarboclastus UW0409 |
| | Bacillus subtilis |
| | Bacillus hexacarbororum |
| | Candida spp. |
| | Candida utilis |
| | Candida utilis ATCC 9226 |
| | Candida guilliermondii |
| | Candida rugosa |
| | Candida lypolytica |
| | Aspergillus niger |
| | Aspergillus versicolor |
| | Desulfovibrio hydrocarbonoclasticus |
| | Desulfovibrio desulfuricans |
| | Endomycopsis lipolytica |
| | Saccharomycopsis lipolytica |
| | Aerobacter aerogenes |
| | Aerobacter aceti |
| | Aerobacter peroxydans |
| | Alcaligines entrophus |
| | Achromobacter spp. |
| | Achromobacter sp. ATCC 21910 |
| | Achromobacter agile |
| | Achromobacter tropunctatum |
| | Actinomyces oligocarbophilus |
| | Aureobasidium pullulans |
| | Arthrobacter sp. ATCC 21908 |
| | Micrococcus spp. |
| | Micrococcus sp. ATCC 21909 |
| | Micrococcus cerificans ATCC 14987 |
| | Micrococcus paraffinae |
| | Microbacterium thodochrous |
| | Mycobacterium phlei |
| | Nocardia opacus |
| | Nocardia corrallina |
| | Pencillium spp. |
| | Pichia spartinae |

Surfactant packages can be formulated from nonionic chemical surfactants or combinations of nonionic and anionic chemical surfactants (preferably in about a 1:1 ratio by weight) without bioemulsifiers but preferably, for emulsion stabilization, with bioemulsifiers in the range of about 1% to about 50% by weight. Surfactant packages comprising bioemulsifiers in the range of about 10% to about 20% by weight and particularly around 15% by weight are preferred. Examples of surfactant packages are: (a) about 10% to about 15% α-emulsan by weight in combination with ethoxylated secondary alcohols having carbon chains of about 11 to about 15 carbon atoms in length [e.g., Tergitol 15-S-X (Union Carbide Corp.)], where X represents the number of moles of ethylene oxide and is preferably greater than 7; (b) about 10% to about 15% a-emulsan by weight in combination with about 20% to about 25% by weight of an ethoxylated trimethylnonanol [e.g., Tergitol TMN-6 (Union Carbide Corp.)] and about 60% to about 70% by weight of an ethoxylated alkyl phenol [e.g., Triton X-114 (Rohn & Haas Co.)]; and (c) about 15% α-emulsan by weight in combination with an ethoxylated alkyl phenol having an R group of about 8 or 9 carbon atoms [e.g., Tergitol NP-40 (Union Carbide Corp.)]. A particularly preferred surfactant package comprises about 10% to about 20% α-emulsan by weight in combination with a nonionic ethoxylated alkyl phenol [e.g., Tergitol NP-40] and an anionic ethoxylated alcohol sulfate [e.g., Alfonic 1412-A (Conoco, Inc.)], using the nonionic and anionic surfactants in a proportion of about 1:1. The particularly preferred surfactant packages are exemplified by the surfactant package comprising about 15% by weight α-emulsan, about 42.5% by weight Tergitol NP-40 and about 42.5% by weight Alfonic 1412-A. Surfactant packages may be formulated full strength or in diluted aqueous solution. The surfactant package most preferred for use with viscous residuals is a combination of anionic surfactants, 85% by weight of an ethoxylated sulfated nonylphenol, and 15% by weight of the sodium salt of a polymerized alkylnaphthalene sulfonic acid with a molecular weight of at least about 500 daltons and preferably at least about 2000 daltons.

VISCOUS CRUDE OILS AND RESIDUAL OILS

The surfactant package compositions of this invention can be used to emulsify or emulsify and substantially stabilize numerous viscous hydrocarbons in oil-in-water emulsions which may be subsequently transported and/or directly burned. As there is no universally accepted, precise definition of the viscous hydrocarbons suitable for use in this invention, they are best described in terms of their general characteristics. Viscous hydrocarbons encompass naturally-occuring viscous crude oils (also called heavy crude oils) as well as residual bottom-of-the-barrel products from refineries, such as vacuum resid, other residual fuel oils and asphalt. [See Section 4, Nomenclature, supra.] While low gravity does not necessarily coincide with high density, these characteristics are generally correlated in viscous hydrocarbons.

Generally, the following characteristics are considered typical of the types of crude oils and residual oils, the handling and utilization of which can be facilitated by the compositions and methods of this invention:
1. Low API gravity, generally at or below about 20° API. This is the most frequently used criterion, both because it is easily measured and because 20° API crude roughly corresponds to the lower limit recoverable with conventional production techniques.
2. Viscosities in the range of about $10^2$ to $10^6$ centipoise (cp) or even higher in some cases.
3. High metal contents. For example, heavy crudes often have nickel and vanadium contents as high as 500 ppm.
4. High sulfur content, e.g., 3 weight percent or more.
5. High asphaltene content.
6. High pour point.

It is to be noted, of course, that lighter crudes may also be emulsified and/or stabilized with the surfactant packages of this invention. However, since the transportation and combustion of light oils do not present the same problems as highly viscous crudes and residuals, the compositions and methods of this invention are more particularly directed to the use of heavy materials. Nevertheless, it may be useful to form pre-atomized fuels out of these light oils for emissions reductions purposes. Those viscous hydrocarbons which can be emulsified with the surfactant packages of this invention and which are most useful to emulsify for transportation and/or burning purposes can be generally defined as having a paraffin content of about 50% by weight or less and an aromatic content of about 15% by weight or greater with viscosities of about 100 centipoise or greater at 150° F. The viscous residuals generally are characterized by a paraffin content in the range from about 4% to about 40% by weight, an aromatic content in the range from about 15% to about 70% by weight and an asphaltene content from about 5% to about 80% by weight.

More specifically, the types of crude oils that can be successfully emulsified and stabilized with the surfactant packages of this invention include Boscan (Venezuela) crude, an east Texas crude, Jibaro and Bartra (Peru) crudes, El Jobo (Venezuela) crude, and a Kansas crude. The specific viscous residuals that can be successfully emulsified and stabilized with surfactant packages of this invention include California vacuum resid, Oklahoma vacuum resid, German visbreaker resid, Texas visbreaker resid, catalytic hydrogenated resid, ROSE resid, and cutback tar.

Furthermore, residual fuel oils such as those classified as ASTM Grade Number 6 Oils can also be emulsified. Number 6 oils, sometimes referred to as "Bunker C" oils, are high-viscosity oils used mostly in commercial and industrial heating. Their utilization normally requires preheating in the storage tank to permit pumping, and additional preheating at the burner to permit atomizing. The extra equipment and maintenance required to handle Number 6 fuels in nonemulsified form usually precludes its use in small installations. The ASTM standard specifications for Number 6 fuel oils are summarized in Table VI ["Standard Specification for Fuel Oils," ASTM Designation D396-80, in: 1981 Book of ASTM Standards, Part 23].

TABLE VI
DETAILED REQUIREMENTS FOR NUMBER 6 FUEL OILS

| | Grade of Fuel Oil (No.6, Preheating Required for Burning and Handling) | |
|---|---|---|
| | Minimum | Maximum |
| Flash Point, °C. (°F.) | 60 (140) | |
| Water and Sediment, Vol % | $2.00^2$ | |
| Saybolt Viscosity, $s^1$ | | |
| Universal at 38° C. (100° F.) | (>900) | (9000) |
| Furol at 50° C. (122° F.) | (>45) | (300) |
| Kinematic Viscosity, $cSt^1$ | | |
| At 50° C. (122° F.) | >92 | 638 |

[1] Viscosity values in parentheses are for information only and not necessarily limiting.
[2] The amount of water by distillation plus the sediment by extraction shall not exceed 2.00%. The amount of sediment by extraction shall not exceed 0.50%. A deduction in quantity shall be made for all water and sediment in excess of 1.0%.

EMULSION FORMATION

The surfactant packages of Section 6.1 can be used to form oil-in-water emulsions containing as much as about 90% by volume of the viscous hydrocarbons described in section 6.2. The aqueous phase into which the hydrocarbon is emulsified can be deionized water, water from a municipal source, or any water, even water with relatively large amounts of dissolved solids such as connate waters or brines, normally located in proximity to oil production, transportation or utilization sites. The aqueous phase can also be an alcohol/water mixture such as methanol/water, ethanol/water or other lower alkanol/water mixtures, and may further contain additives such as anti-corrosion agents, anti-pollution agents or combustion improvers. Oil-in-water emulsions preferably contain oil/water ratios of about 60/40 to about 80/20, and more preferably from about 65/35 to about 75/25.

In forming oil-in-water emulsions, it is economically desirable to use as little of the surfactant package as possible while maintaining acceptable emulsion characteristics to suit the particular transportation or utilization requirements. The surfactant packages of Section 6.1 can be used in proportions of surfactant package:hydrocarbon from about 1:100 to about 1:20,000 by weight. The proportion used can depend on the type of hydrocarbon to be emulsified and/or the purpose for emulsifying it.

Oil-in-water emulsion formation can be brought about by any number of suitable procedures. For example, the aqueous phase containing an effective amount of surfactant package can be contacted with the hydrocarbon phase by metered injection just prior to a suitable mixing device. Metering is preferably maintained such that the desired hydrocarbon/water ratio remains relatively constant. Mixing devices such as pump assemblies or in-line static mixers can be used to provide sufficient agitation to cause emulsification. As a more specific example, for the transportation or utilization of residual oils, it may be possible to emulsify the hot residual oil in about 30% aqueous phase (v/v) with one of the surfactant packages of Section 6.1 as it exits the vacuum still of a refinery.

FORMATION OF PRE-ATOMIZED FUELS AT HIGH TEMPERATURES

Some low gravity residual hydrocarbons are extremely viscous and require very high temperatures to make them fluid enough to handle. Such hydrocarbons can be characterized by a viscosity greater than about 1000 cp at 212° F. Maintaining such high temperatures is not economically feasible for the long term storage and transportation of these hydrocarbons. Also, it is not economically feasible to blend these viscous hydrocarbons with much lighter oils (cutter stock) due to either the quantity of lighter oil required to achieve a viscosity which can be handled or the unfavorable characteristics of the viscous hydrocarbon which do not allow for homogeneous blending of lighter oils.

This invention offers a novel approach to handling extremely viscous hydrocarbons by the stable dispersion of such viscous hydrocarbons into water to form pre-atomized fuels. Pre-atomized fuel formation is achieved by heating the viscous hydrocarbon to a high temperature in order to make it fluid. The hot hydrocarbon phase is brought in contact with the aqueous phase containing appropriate surfactants and/or stabilizers as described in Section 6.1. A key to achieving successful pre-atomized fuel formation is the maintenance of pressure throughout the entire process such that the aqueous phase is not allowed to vaporize. By maintaining the appropriate pressure, i.e., the pressure required to prevent the water in the aqueous phase from boiling, the aqueous phase remains in a liquid state, thus allowing the stable dispersion of the hydrocarbon phase into a continuous water phase. The resulting hot pre-atomized fuel may be rapidly cooled using an appropriate heat exchange device so that the outlet temperature of the pre-atomized fuel is below the vaporization temperature of the aqueous phase at ambient pressure. Alternatively, the pressure may be reduced and the mixture cooled by flashing a portion of the water contained in the pre-atomized fuel.

FORMATION OF PRE-ATOMIZED FUELS USING A THERMALLY CRACKED HYDROCARBON DISCHARGE

As is generally known in the refining industry, residual hydrocarbons obtained from the discharge of thermal cracking units have presented unusual problems. The extreme conditions required in processing to obtain greater quantities of high gravity hydrocarbons have resulted in resids which are very susceptible to separation into distinct, non-mixable fractions. The reasons for the occurrence of this phenomenon are not fully known; however, it is believed that the destabilization of high molecular weight components such as asphaltenes is a contributing factor. When such hydrocarbons are used to form pre-atomized fuels as described in Section 6.3., the resulting oil-in-water emulsion may separate into three phases after a short period of static storage. These phases consist of a low API gravity hydrocarbon bottom phase, a water/surfactant middle phase, and a high API gravity hydrocarbon upper phase. Without wishing to be bound or restricted by any particular theory, applicants theorize that the separation may be due to the slow cooling of the pre-atomized fuel which allows sufficient time for the occurrence of complex interactions that may be attributed to both "sticky state" and Ostwald ripening phenomena. The tendency toward separation can be decreased by the use of an appropriate heat exchange device or method to rapidly quench the freshly formed pre-atomized fuel to a temperature at least about 100° F. below the softening point of the hydrocarbon. By rapidly quenching the oil-in-water emulsion as it exits the mixing unit, a stable pre-atomized fuel is achieved that does not separate with time. It is further theorized that the rapid cooling of the hot pre-atomized fuel does not allow sufficient time for the complex interactions stated above to occur.

MIXING OF A SLURRY WITH A PRE-ATOMIZED FUEL

An economical way to increase the btu content of a liquid fuel is achieved by incorporating a high softening point hydrocarbonaceous material (such as coal, coke, ROSE residual, etc.) into a lower softening point fuel. This is usually accomplished by grinding a high softening point hydrocarbon to form very small particles (usually approximately 100 $\mu$m in size) and then, dispersing the solid particles in the liquid fuel. The dispersion of a solid in a liquid, however, usually results in the production of a fuel with unfavorable characteristics such as increased viscosity.

A novel method of economically utilizing a high softening point hydrocarbonaceous material (such as coal, coke, ROSE residual, etc.) is achieved by incorporating it into a pre-atomized fuel. This is accomplished by first grinding a material of high softening point to form very small particles (generally less than about 30 $\mu$m) and then forming a slurry by dispersing the particles in a continuous aqueous phase containing a pre-atomized fuel-compatible surfactant package.

The slurry of dispersed particles is mixed at an appropriate ratio with a pre-atomized fuel formulated from a hydrocarbon other than that used to form the slurry. The mixing of a slurry with a pre-atomized fuel results in a liquid fuel which has a viscosity lower then either the slurry or the pre-atomized fuel prior to mixing. The reasons for the reduced viscosity observed in a slurry/-pre-atomized fuel mixture are not fully known; however, without wishing to be bound or restricted by any particular theory, applicants believe that the reduction of particle-to-particle interaction is a contributing factor.

PROPERTIES OF EMULSAN-STABILIZED HYDROCARBOSOLS

The hydrocarbon droplets of hydrocarbon-in-water emulsions generally rise to the surface and "float" on the aqueous phase in a process known as creaming, provided the density of the hydrocarbon phase is less than that of the aqueous phase and the droplets in the dispersed phase are too big to be stabilized by Brownian motion. If the "cream" remains undisturbed for a given period of time, the droplets coalesce, giving rise to two separate phases. The emulsans, particularly α-emulsan, are extremely effective in retarding coalescence and the emulsan-stabilized droplets in the "cream" are easily redispersible in the aqueous phase.

The principal factors controlling emulsion stability are electrostatic (charge) effects and steric effects. The properties of emulsans lend themselves to optimal exploitation of these mechanisms. Their large molecular weight and highly specific three-dimensional structure result in an efficient coverage of the hydrocarbon/water interface. This effectively prevents oil-to-oil contact when collisions occur between adjacent droplets. Simultaneously, the polyanionic nature of emulsans causes the surfaces of emulsion droplets to be negatively charged which creates repulsive forces and significantly decreases the collision frequency between hydrocarbon droplets. In addition, the absence of multimolecular emulsan micelles in the water phase and the lack of emulsan solubility in the hydrocarbon phase provides an efficient migration and attachment of the emulsan molecules to the oil/water interface. The overall chemical requirements for emulsion stabilization thus become very small and directly related to the oil droplet size, i.e., interfacial area desired.

The advantages that emulsans offer over classical emulsion stabilizers may be summarized as follows. In a hydrocarbosol, emulsan predominantly resides at the oil/water interface only; essentially no measurable emulsan is found in the water phase nor in the oil phase. Very small amounts of emulsan are required, even in the presence of excess water. The emulsan-stabilized hydrocarbosol effectively resists inversion to water-in-oil emulsions, even at water:oil ratios of less than about 1:4. This is partly due to emulsans' insolubility in oil and may also be due in part to the specific three-dimensional structure of the emulsan molecule.

BLENDING OF HYDROCARBONS

In some cases hydrocarbons may be too viscous for conventional processing or have characteristics (i.e., low gravity; excessive paraffinic, aromatic, and/or asphaltic contents; etc.) which make them unfavorable to incorporate into stable pre-atomized fuels. One method to reduce viscosity for processing or alleviate unfavorable characteristics is blending the unfavorable hydrocarbon with one which is favorable resulting in a hydrocarbon having characteristics suitable for pre-atomized fuel formation. In this way an otherwise unusable hydrocarbon can be "adjusted" to a usable form.

TRANSPORTATION AND UTILIZATION OF HYDROCARBOSOLS

Hydrocarbosols, because they contain bioemulsifiers, have properties which allow them to be transported in tankers, barges and more importantly through conventional pipelines, including standard, non-heated pipeline networks. Among the properties exhibited by hydrocarbosols that are particularly important for pipelining are reduced viscosity, stabilization against coalescence even under considerable rates of shear, compatibile formation with high-salinity aqueous phases, and non-corrosive nature. Hydrocarbosols with viscosities below about 500 cp at about 60° F. allow the economical use of centrifugal pumps for transportation of oil at acceptable flow rates and reasonable pressure drops. For pipelining purposes, it is desirable to use the surfactant packages of Section 6.1 at their minimum effective concentrations which frequently are in a proportion within the range of about 1:100 to about 1:5,000. Hydrocarbosols may be stored in non-heated storage tanks where agitation may be optionally supplied to maintain homogeneity.

Once transported to their destination, hydrocarbosols can be demulsified if desired. More importantly, hydrocarbosols like other pre-atomized fuels can be utilized directly, without dewatering, as burnable fuels. They can be used in combustion facilities which presently use Number 6 fuel oils, or so-called Bunker C oils, to fire, inter alia, steam generators, heating systems or blast furnaces. Hydrocarbosols, as is the case with other pre-atomized fuels, may potentially allow for less expensive plant operation by reducing fuel costs, storage costs and material handling costs. Hydrocarbosols and other preatomized fuels may have applications as substitutes for Number 2 or higher grade fuels depending on the situation.

Where long storage periods or transportation over long distances prior to utilization is not required, the stability exhibited by hydrocarbosols becomes less critical If short distance-transportation or on-site utilization is contemplated, it may not be necessary to form bioemulsifier-stabilized emulsions. Further, it is not necessary to form stabilized emulsions in order to facilitate combustion; i.e., emulsion stability is not generally required for good combustion characteristics. Therefore, pre-atomized fuels suitable for burning can be made by emulsifying viscous hydrocarbons with the surfactant packages of Section 6.1 which are formulated with a chemical surfactant alone or a combination of chemical surfactants. For instance, a 70/30, Number 6 fuel oil/water emulsion can be made with a surfactant package comprising a nonionic chemical surfactant and an anionic chemical surfactant in equal proportion by weight and the resulting oil-in-water emulsion (which can also be referred to as a pre-atomized fuel) can be burned directly.

EXAMPLES

PREPARATION OF BIOEMULSIFIERS

PREPARATION OF TECHNICAL GRADE α-EMULSAN

The α-emulsans produced by *Acinetobacter calcoaceticus* ATCC 31012 during fermentation on ethanol are known bioemulsifiers as described in U.S. Pat. No. 4,395,354, incorporated by reference supra. The α-emulsans used in the experiments described infra were technical grade materials (unless otherwise indicated) which were prepared in either of two ways. Both methods of preparation involved enzyme treatment and drying but differed in the order in which these steps were performed. By one method, centrifuged (approximately 90% cell-free) fermentation broth containing α-emulsans resulting from a fermentation of *Acinetobacter calcoaceticus* ATCC 31012 in ethanol medium was drum-dried and the resulting material was treated in the following manner prior to use. A 10% by weight suspension of the material, so-called technical grade α-emulsan, was prepared in deionized water and heated to 50°-60° C. while continuously stirring. The pH of the suspension was adjusted to pH 8.5 by adding 50% by weight sodium hydroxide (diluted, if necessary). Protease enzyme (NOVO Industries, 1.5M Alcalase) was added at a level of 1 part protease: 500 parts solid α-emulsan. The mixture was allowed to remain at 50°-60° C. while being stirred for about three hours. Reactions were run to completion as judged by the absence of visible precipitable emulsan following centrifugation of the reaction mixture After completion of the enzyme treatment, the reaction mixtures were raised to approximately 70° C. to denature the protease and stop its activity. The solutions were cooled to room temperature and Cosan PMA-30 (Cosan Corporation), a preservative, was added at a level of 1 part Cosan:500 parts α-emulsan solution.

By another method, enzyme treatment of the α-emulsan was performed prior to drum drying according to the folowing protocol. Fermentation broth containing α-emulsan resulting from a fermentation of *Acinetobacter calcoaceticus* ATCC 31012 in ethanol medium was centrifuged to remove approximately 90% of the bacterial cells. To the centrifuged broth, protease enzyme (as previously described) was added in a ratio of 1 gram protease:500 units per milligram of Specific Emulsification Activity (where one unit per milligram of Specific Emulsification Activity is defined as that amount of emulsifying activity per milligram of bioemulsifier which yields 100 Klett absorption units using a standard hydrocarbon mixture consisting of 0.1 ml of 1:1 (v/v) hexadecane/2-methylnaphthalene and 7.5 ml of Tris-Magnesium buffer). The protease reaction was run to completion as described supra. The protease-treated centrifuged broth was then evaporated to a 10% (w/v) slurry of α-emulsan. The slurry was sprayed dried and the resulting material is also referred to as technical grade α-emulsan.

ADDITIONAL PREPARATIONS OF ACINETOBACTER CALCOACETICUS BIOEMULSIFIERS

Fermentations of *Acinetobacter calcoaceticus* ATCC 31012 were run on ethanol as described in U.S. Pat. No. 4,395,354. The following fractions of the resulting broth were used to formulate surfactant packages: whole broth, supernatants, cells, enzyme-treated whole broth, enzyme-treated supernatants, enzyme-treated cells (where the enzyme treatment was as described for the second method in Section 7.1.1. supra), homogenized cells, boiled cells, and so-called "Millipore emulsan." Millipore emulsan is prepared by Millipore filtering whole broth to remove cells, followed by enzyme treatment (described supra) and ultrafiltration. The foregoing preparations were used in liquid or wet form. The Millipore emulsan samples can be further dialyzed against ammonium bicarbonate and freeze-dried prior to use in surfactant packages.

Whole broth and enzyme-treated whole broth from fermentations of *Acinetobacter calcoaceticus* ATCC 31012 on soap stock (run under conditions similar to those described in U.S. Pat. No. 4,230,801, incorporated by reference, supra) were also used.

*Acinetobacter calcoaceticus* NS-1 (NRRL B-15847) was grown in a fermentor on ethanol medium under conditions similar to those described in U.S. Pat. No. 4,395,354. Both whole broth and enzyme-treated whole broth were used to formulate surfactant packages.

*Acinetobacter calcoaceticus* strains NS-4 (NRRL B5848), NS-5 (NRRL B-15849), NS-6 (NRRL B-15860) and NS-7 (NRRL B-15850) were grown for 3 days in shake flask cultures in 2% ethanol medium as described in U.S. Pat. No. 4,395,354. Enzyme-treated whole broth samples were prepared from the NS-4, NS-5 and NS-7 cultures. Enzyme-treated supernatant samples were prepared from NS-4, NS-5, NS-6 and NS-7 cultures. These preparations were also used to formulate surfactant packages.

VISCOUS HYDROCARBON CHARACTERISTICS

BOSCAN CRUDE OIL

The Boscan crude oil used in the experiments described infra was a heavy crude produced from the oilfields of western Venezuela. The characteristics of the crude, its specific gravity, API gravity (°API), paraffin content (% by weight), aromatic content (% by weight), asphaltene content (% by weight) and viscosity (in centipoise) versus temperature (degrees Fahrenheit) profile, were determined experimentally and are summarized in Table VII. The paraffin, aromatic and asphaltene content were determined by the methods described in Section 7.2.12, infra.

TABLE VII

| BOSCAN CRUDE OIL CHARACTERISTICS | | |
|---|---|---|
| Specific Gravity | = | 0.983 |
| API Gravity (calculated) | = | 12.5° API |
| Paraffin content | = | 18.0% (w/w) |
| Aromatic content | = | 60.0% (w/w) |
| Asphaltene content | = | 22.0% (w/w) |
| Viscosity (cp) | Temperature (°F.) | |
| 4,500 | 140 | |
| 24,000 | 100 | |
| 192,000 | 60 | |

TEXAS FIREFLOOD CRUDE OIL

The Texas crude oil used in the experiments described infra was produced from an oilfield in east Texas (Quitman, Tex.) by the fireflood method. The characteristics of the crude, its specific gravity at 26° C. [ASTM D1217-81], API gravity, paraffin content, aromatic content and viscosity versus temperature profile, were determined experimentally as described in Section 7.2.11, infra, and are summarized in Table VIII.

TABLE VIII

| TEXAS FIREFLOOD CRUDE OIL CHARACTERISTICS | | |
|---|---|---|
| Specific Gravity | = | 0.981 |
| API Gravity (calculated) | = | 12.7° API |
| Paraffin content | = | 26.1% (w/w) |
| Aromatic content | = | 51.1% (w/w) |
| Viscosity (cp) | Temperature (°F.) | |
| 1,748 | 160 | |
| 4,085 | 140 | |
| 8,752 | 120 | |
| 27,615 | 100 | |
| 82,000 | 80 | |

NUMBER 6 RESIDUAL TEST FUEL OIL

The Number 6 residual fuel oil used in the experiment described in Section 7.5 was obtained from the MIT Energy Laboratory (Cambridge, Mass.). The characteristics of this residual fuel oil, its specific gravity, API gravity, paraffin content, aromatic content, asphaltene content and viscosity versus temperature profile were determined experimentally and are summarized in Table IX. The paraffin, aromatic and asphaltene content were determined by the methods described in Section 7.2.12, infra.

TABLE IX
RESIDUAL NO. 6 TEST FUEL OIL CHARACTERISTICS

| | | |
|---|---|---|
| Specific Gravity | = | 0.977 |
| API Gravity (calculated) | = | 13.3° API |
| Paraffin content | = | 23% (w/w) |
| Aromoatic content | = | 38% (w/w) |
| Asphaltene content | = | 39% (w/w) |
| Viscosity (cp) | Temperature (°F.) | |
| 1,200 | 100 | |
| 5,000 | 70 | |
| 20,000 | 40 | |

UNION CUTBACK TAR

The Union cutback tar used in the experiments described infra was a California resid which had been mixed with cutter stock to facilitate handling. The characteristics of this tar, its specific gravity, API gravity, paraffin content, aromatic content, asphaltene content, ash content and viscosity versus temperature profile were determined experimentally and are summarized in Table X. The paraffin, aromatic and asphaltene content were determined by the methods described in Section 7.2.12, infra.

TABLE X
UNION CUTBACK TAR CHARACTERISTICS

| | | |
|---|---|---|
| Specific Gravity | = | 0.98 |
| API Gravity (calculated) | = | 12.9° API |
| Paraffin content | = | 22% (w/w) |
| Aromatic content | = | 54% (w/w) |
| Asphaltene content | = | 24% (w/w) |
| Ash content | = | 7% (w/w) |
| Viscosity (cp) | Temperature (°F.) | |
| 1,796 | 210 | |
| 4,490 | 190 | |
| 12,347 | 170 | |
| 123,479 | 130 | |

CALIFORNIA VACUUM RESID

The California vacuum Resid used in the experiments described infra was a vacuum bottom obtained from a Kern County crude oil and provided by a California refinery. The characteristics of this residual oil, its specific gravity, API gravity, paraffin content, aromatic content asphaltene content, and viscosity versus temperature profile were determined experimentally and are summarized in Table XI. The paraffin, aromatic and asphaltene content were determined by the methods described in Section 7.2.12, infra.

TABLE XI
CALIFORNIA VACUUM RESID CHARACTERISTICS

| | | |
|---|---|---|
| Specific Gravity | = | .9934 |
| API Gravity (calculated) | = | 10.9° API |
| Paraffin content | = | 17% (w/w) |
| Aromatic content | = | 72% (w/w) |
| Asphaltene content | = | 11% (w/w) |
| Viscosity (cp) | Temperature (°F.) | |
| 4,490 | 220 | |
| 27,838 | 180 | |
| 206,540 | 140 | |

OKLAHOMA VACUUM RESID

The Oklahoma vacuum resid used in the experiments described infra was a vacuum bottom obtained from a mid continent refinery. The characteristics of this residual oil, its specific gravity, API gravity, paraffin content, aromatic content, asphaltene content, and viscosity versus temperature profile were determined experimentally and are summarized in Table XII. The paraffin, aromatic and asphaltene content were determined by the methods described in Section 7.2.12, infra.

TABLE XII
OKLAHOMA VACUUM RESID CHARACTERISTICS

| | | |
|---|---|---|
| Specific Gravity | = | .9364 |
| API Gravity (calculated) | = | 19.6° API |
| Paraffin content | = | 20% (w/w) |
| Aromatic content | = | 70% (w/w) |
| Asphaltene content | = | 10% (w/w) |
| Viscosity (cp) | Temperature (°F.) | |
| 3,098 | 220 | |
| 14,143 | 180 | |
| 98,780 | 140 | |
| 251,440 | 120 | |

CATALYTIC HYDROGENATED RESID (H-OIL)

The H-oil used in the experiments described infra was obtained by a process in which residual oil is catalytically hydrogenated. This resid was from a refinery in Louisiana. The characteristics of this residual oil, its specific gravity, API gravity, paraffin content, aromatic content, asphaltene content, and viscosity versus temperature profile were determined experimentally and are summarized in Table XIII. The paraffin, aromatic and asphaltene content were determined by the methods described in Section 7.2.12,

TABLE XIII
H-OIL CHARACTERISTICS

| | | |
|---|---|---|
| Specific Gravity | = | 1.0196 |
| API Gravity (calculated) | = | 7.3° API |
| Paraffin content | = | 22% (w/w) |
| Aromatic content | = | 57% (w/w) |
| Asphaltene content | = | 21% (w/w) |
| Viscosity (cp) | Temperature (°F.) | |
| 2,424 | 200 | |
| 19,936 | 160 | |
| 244,705 | 120 | |

ROSE RESID

The ROSE resid used in the experiments described infra was obtained by the ROSE (Residuum Oil Supercritical Extraction) process which extracts remaining light fractions from vacuum bottoms. The characteristics of this residual oil, its specific gravity, API gravity, paraffin content, aromatic content, asphaltene content, and viscosity versus temperature profile were determined experimentally and are summarized in Table XIV. The paraffin, aromatic and asphaltene content were determined by the methods described in Section 7.2.12, infra.

TABLE XIV
ROSE RESID CHARACTERISTICS

| | |
|---|---|
| Specific Gravity = | 1.17 |
| API Gravity (calculated) = | −10.6° API |
| Paraffin content = | 4% (w/w) |
| Aromatic content = | 18% (w/w) |
| Asphaltene content = | 78% (w/w) |

GERMAN VISBREAKER RESID

The German visbreaker used in the experiments described infra was obtained by thermal cracking of vacuum bottoms. The visbreaker resid was from a refinery located in the Federal Republic of Germany. The characteristics of this residual oil, its specific gravity, API gravity, paraffin content, aromatic content, asphaltene content, and viscosity versus temperature profile were determined experimentally and are summarized in Table XV. The paraffin, aromatic and asphaltene content were determined by the methods described in Section 7.2.12, infra.

TABLE XV

GERMAN VISBREAKER RESID CHARACTERISTICS

| | |
|---|---|
| Specific Gravity = | .9553 |
| API Gravity (calculated) = | 16.6° API |
| Paraffin content = | 17% (w/w) |
| Aromatic content = | 61% (w/w) |
| Asphaltene content = | 22% (w/w) |

| Viscosity (cp) | Temperature (°F.) |
|---|---|
| 2,470 | 200 |
| 16,389 | 160 |
| 174,032 | 120 |

7.2.10. TEXAS VISBREAKER RESID

The Texas visbreaker used in the experiments described infra was obtained by thermal cracking of vacuum bottoms. The visbreaker resid was from a refinery located in Texas. The characteristics of this residual oil, its specific gravity, API gravity, paraffin content, aromatic content, asphaltene content, and viscosity versus temperature profile were determined experimentally and are summarized in Table XVI. The paraffin, aromatic and asphaltene content were determined by the methods described in Section 7.2.12, infra.

TABLE XVI

TEXAS VISBREAKER RESID CHARACTERISTICS

| | | |
|---|---|---|
| Specific Gravity | = | 0.989 |
| API Gravity (calculated) | = | 11.6° API |
| Paraffin content | = | 28% (w/w) |
| Aromatic content | = | 48% (w/w) |
| Asphaltene content | = | 24% (w/w) |

| Viscosity (cp) | Temperature (°F.) |
|---|---|
| 449 | 200 |
| 898 | 160 |
| 4,624 | 120 |
| 61,782 | 80 |

METHODS FOR DETERMINING HYDROCARBON CHARACTERISTICS

Viscosity versus temperature profiles were obtained by heating the oils to the given temperatures of Tables VII–XIII and XV–XVI and measuring viscosities in a Rheomat 30 rheometer (Contraves AG), at an approximate shear rate of 30 sec$^{-1}$.

The paraffin content and aromatic content of some of the oils of the foregoing examples were determined by a method in which the oil is separated into fractions based on hydrocarbon solubilities in n-heptane and methylene chloride. The paraffin fraction is defined as that hydrocarbon fraction which is soluble in n-heptane. The aromatic fraction is defined as that hydrocarbon fraction which is soluble in methylene chloride.

The materials used are as follows: an analytical balance, accurate to 0.1 milligram (mg), a 500 millimeter (mm) burette-type chromatography column, tared collection flasks, reagent grade methylene chloride, n-heptane (99 mole percent) and alumina adsorbent. The alumina was activated by heating it in an oven set at 310° C. for 12–14 hours. The alumina was cooled in a dessicator and stored in a tightly capped bottle prior to use. Chromatography columns packed ¾ full were used.

The separation was carried out by quantitatively weighing 500 to 1000 mg ($\pm$0.1 mg) of sample oil. Viscous oils were weighed into sample pouches made of tissue paper which were subsequently placed into the column. (Non-viscous oils are usually weighed directly into the columns.) After introduction of the sample oil into the columns, 200 to 250 ml of n-heptane were allowed to flow through the column. It was preferable for the solvent to be added in a manner which did not excessively disturb the alumnina packing. The eluent was collected in a tared evaporating flask. After all the n-heptane had flowed through the column, the first evaporating flask was replaced with another tared flask. Methylene chloride was then introduced into the column and allowed to flow through it.

The collected eluents were removed from each flask by vacuum evaporation following appropriate safety precautions. The dry flasks were reweighed and the percentage of paraffins and aromatics were calculated based on the original weight of the oil sample. All samples were run in duplicate.

Specific gravity was determined by weighing a measured volume of sample oil and calculating the ratio of the mass of the oil to the mass of an equal volume of water. API gravities were then calculated from the specific gravity by the general formula:

$$°API = \frac{141.5}{\text{specific gravity at } 60/60° \text{ F.}} - 131.5.$$

METHODS FOR DETERMINING HYDROCARBON CHARACTERISTICS, INCLUDING ASPHALTENE CONTENT

The methods used to characterize the hydrocarbons of Examples 7.2.1, 7.2.3 through 7.2.10 are essentially the same as those in Section 7.2.11. However, a new procedure was utilized for determining the asphaltic in addition to the paraffinic and aromatic contents of viscous hydrocarbons. It is described below.

The paraffin, asphaltene and aromatic contents of the sample hydrocarbons were obtained by a method in which the hydrocarbons are dispersed in n-heptane, the asphaltenes removed by filtration and the remaining components separated based on their solubilities in n-heptane and methylene chloride. The asphaltene fraction (the precipitate) is filtered from a dispersion of the hydrocarbon in n-heptane. The paraffin fraction is that portion soluble in n-heptane. The aromatic fraction is that portion soluble in methylene chloride.

The materials used are as folows: an analytical balance, accurate to 0.1 milligram (mg), a blender (Osterizer Galaxy 14) and blades fitted to a 500 ml Mason jar, preweighed Whatman #1 paper, filter funnel, rotary evaporation apparatus, a 500 millimeter (mm) burette-type chromatography column, tared collection flasks, reagent grade methylene chloride, n-heptane (99 mole percent) and alumina adsorbent. The alumina was activated by heating it in an oven at 310° C. for 12–14 hours. The alumina was cooled in a dessicator and stored in a tightly capped bottle prior to use. Chromatography columns packed ¾ full were used.

Hydrocarbon samples of 1–2 g were quantitatively added to Mason jars containing 100 ml of n-heptane. After blending for 1–2 minutes at maximum speed, the jar and its contents were washed with an additional 100 ml of n-heptane. The dispersed sample was filtered through Whatman #1 paper and the filtrate collected into Erlenmeyer flasks. After introduction of the filtrate to the column, the effluent was collected into a tared evaporation flask. When n-heptane was completely eluted, 200 ml of methylene chloride was added to the column and the eluted material collected into another tared evaporation flask until the column ran dry.

The eluting solvents were removed using a rotating vacuum evaporator at temperatures appropriate to the solvents.

The tared filter paper and flasks were reweighed and the percentage of asphaltenes, paraffins, and aromatics were calculated based on the original weight of the sample. Individual samples were run in duplicate. All percentages apearing in the foregoing tables for paraffinic, aromatic and asphaltene content have been adjusted to 100% recovery for comparative purposes.

VISCOSITY REDUCTION EXPERIMENTS
SURFACTANT PACKAGES AND EMULSIFICATION OF HYDROCARBONS

The compositions of five surfactant packages which have been used successfully to emulsify Boscan crude oil are presented in Table XVII. The $\alpha$emulsan used was a technical grade $\alpha$-emulsan prepared according to the first method described in Section 7.1.1. The chemical surfactants, Tergitol 15-S-X (where X indicates the number of moles of ethylene oxide), Tergitol TMN-6, Tergitol NP-40 (Union Carbide Corp.), Triton X-114 (Rohm & Haas Co.) and Alfonic 1412-A (Conoco) are commercially available. Emulsions were formed in an Osterizer Galaxy 14 blender at low speed in a manner preventing the beating of air into the emulsion. The ratio of Boscan crude to deionized water was 70:30 by volume (v/v). The surfactant packages were used successfully over a range of 1:250–1:2,000 [surfactant package:oil, by weight (w/w)]. The surfactant package comprising 15% $\alpha$-emulsan, 42.5% Tergitol NP-40 and 42.5% Alfonic 1412-A was considered a preferred surfactant package for use with Boscan crude oil. Emulsions (70/30, Boscan crude/deionized water) formed with this surfactant package at 1 part per 2,000 parts oil have been observed to be stable and maintain reduced viscosities for a period of at least three weeks. In addition, this surfactant package has been used to form 70/30 Boscan crude/water emulsions at as low a treatment rate as 1 part per 20,000 parts oil.

TABLE XVII
SURFACTANT PACKAGES FOR EMULSIFYING BOSCAN CRUDE

| Package # Component | % of Component (w/w) in Surfactant Package | | | | |
|---|---|---|---|---|---|
| | 1 | 2 | 3 | 4 | 5 |
| $\alpha$-Emulsan | 10 | 13 | — | 15 | 15 |
| Tergitol 15-S-X | 90 | — | — | — | — |
| Tergitol TMN-6 | — | 22 | — | — | — |
| Tergitol NP-40 | — | — | 100 | 85 | 42.5 |
| Triton X-114 | — | 65 | — | — | — |
| Alfonic 1412-A | — | — | — | — | 42.5 |

Other surfactants which successfully (alone or in combination) emulsified general type viscous oils included Alfonic 1012-60 (Conoco, Inc.), an ethoxylated linear alcohol with chain lengths of 10 to 12 carbon atoms ($C_{10}$–$C_{12}$) and 60% ethoxylation; Protowet 4196 (Proctor Chemical Co.), a sodium salt of a sulfosuccinate of a nonyl phenol ethoxylate; Protowet 4337 (Proctor Chemical Co.), sodium dicyclohexyl sulfosuccinate; Tween 80 (ICI Americas, Inc.), polyoxyethylene (20) sorbitan monooleate; Pluronic F88 (BASF Wyandotte), a block copolymer of propylene oxide and ethylene oxide; Petronate L (Witco Chemical Corp.) a sodium petroleum sulfonate; and Conoco AXS (Conoco, Inc.), ammonium xylene sulfonate.

The compositions of several surfactant packages which have been successfully used to emulsify Oklahoma vacuum resid are listed in Table XVIII. The $\alpha$-emulsan used was prepared from a whole broth of emulsan according to the methods described in Section 7.1.2. The surfactants, Tetronic 707 (BASF Wyandotte Corp.), Alipal EP-110, CO-436 (GAF Corp.) Daxad 17 (W. R. Grace & Co.) Nopcosant (Diamond Shamrock), Triton X series and Tamol 850 (Rohm and Haas Co.), Tergitol NP series (Union Carbide Corp.) and Conco Sulfate 219 (Continental Chemical Co.) are commercially available. Emulsions were formed in an Osterizer Galaxy 14 blender at medium speed in a manner preventing the beating of air into the emulsion. The ratio of the Oklahoma vacuum resid to tap water was 70:30 by weight (w/w). The surfactant packages were used successfully over a range of 1:10 to 1;250 (surfactant package:oil) by weight (w/w). The surfactant package comprising 15% Daxad 17 and 85% Alipal CO-436 was considered a preferred surfactant package for use with Oklahoma vacuum resid. The emulsion produced with this package has been observed to be stable and maintain a reduced viscosity for at least 5 weeks. This formulation has been used to form a 70/30 resid/water emulsion at a treatment as low as 1 part to 750 parts of oil.

TABLE XVIII
SURFACTANT PACKAGES FOR RE-ATOMIZED FUELS

| Package # Component | % of component in package (w/w) | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| $\alpha$-Emulsan: | | | | | | | | | | | | | |
| whole broth | 15 | 15 | 15 | 15 | 15 | — | — | — | — | — | — | — | — |
| | 15 | | | | | | | | | | | | |
| technical | — | — | — | — | — | — | — | — | — | — | — | — | — |
| Tetronic 707 | 85 | — | — | — | — | — | — | — | — | — | — | — | — |
| Alipal EP-110 | — | 85 | — | — | — | — | 100 | — | — | — | — | — | — |
| AlipaL CO-436 | — | — | 85 | — | — | — | — | 100 | — | — | — | — | — |
| Tamol 850 | — | — | — | — | — | — | — | — | — | — | — | — | — |
| Daxad 17 | — | — | — | — | — | — | — | — | 100 | — | — | — | — |
| Nopcosant | — | — | — | — | — | — | — | — | — | 100 | — | — | — |
| Triton X-114 | — | — | — | — | — | — | — | — | — | — | — | — | — |
| Triton X-165 | — | — | — | 85 | — | 51 | — | — | — | — | 100 | — | — |
| Triton X-405 | — | — | — | — | — | — | — | — | — | — | — | — | — |

TABLE XVIII-continued

SURFACTANT PACKAGES FOR RE-ATOMIZED FUELS

| Component | 1 | 2 | 3 | 4 | 5 | 6 | 7 | 8 | 9 | 10 | 11 | 12 | 13 |
|---|---|---|---|---|---|---|---|---|---|---|---|---|---|
| Triton X-705 | — | — | — | — | — | — | — | — | — | — | — | — | — |
| Tergitol NP-6 | — | — | — | — | 28 | 11 | — | — | — | — | — | — | — |
| Tergitol NP-8 | — | — | — | — | — | — | — | — | — | — | — | — | — |
| Tergitol NP-40 | — | — | — | — | 57 | 23 | — | — | — | — | — | — | 100 |
| Tergitol NP-70 | — | — | — | — | — | — | — | — | — | — | — | — | — |
| Orzan A | — | — | — | — | — | — | — | — | — | — | — | — | — |
| Lignosol BD | — | — | — | — | — | — | — | — | — | — | — | — | — |
| Conco Sulfate 219 | — | — | — | — | — | — | — | — | — | — | — | — | — |

| Package # | % of component in package (w/w) | | | | | | | | | | | | | |
|---|---|---|---|---|---|---|---|---|---|---|---|---|---|---|
| Component | 14 | 15 | 16 | 17 | 18 | 19 | 20 | 21 | 22 | 23 | 24 | 25 | 26 | 27 |
| α-Emulsan: | | | | | | | | | | | | | | |
| whole broth | 17 | 15 | — | — | 16.7 | — | — | — | — | — | — | 15 | 15 | — |
| technical | — | — | 14.2 | 14.2 | — | — | — | — | — | — | — | — | — | — |
| Tetronic 707 | — | — | — | — | — | — | — | — | — | — | — | — | — | — |
| Alipal EP-110 | — | — | — | — | — | — | — | 85 | 85 | — | — | — | — | — |
| Alipal CO-436 | — | — | — | — | — | 85 | 85 | — | — | — | — | — | — | 85 |
| Tamol 850 | — | — | — | — | — | — | — | — | — | — | — | — | — | 15 |
| Daxad 17 | — | — | — | — | — | 15 | — | 15 | — | 15 | — | — | — | — |
| Nopcosant | — | — | — | — | — | — | 15 | — | 15 | — | 15 | — | — | — |
| Triton X-114 | 50 | — | 42.8 | — | — | — | — | — | — | — | — | — | — | — |
| Triton X-165 | — | — | — | — | — | — | — | — | 85 | 85 | — | — | — | — |
| Triton X-405 | — | 42.5 | — | 42.8 | — | — | — | — | — | — | — | — | — | — |
| Triton X-705 | — | — | — | — | 50.0 | — | — | — | — | — | — | — | — | — |
| Tergitol NP-6 | — | — | — | — | — | — | — | — | — | — | — | — | — | — |
| Tergitol NP-8 | 33 | — | 28.6 | — | — | — | — | — | — | — | — | — | — | — |
| Tergitol NP-40 | — | 42.5 | — | 28.6 | — | — | — | — | — | — | — | 85 | — | — |
| Tergitol NP-70 | — | — | — | — | 33.3 | — | — | — | — | — | — | — | — | — |
| Orzan A | — | — | — | — | — | — | — | — | — | — | — | — | — | — |
| Lignosol BD | — | — | 14.2 | 14.2 | — | — | — | — | — | — | — | — | — | — |
| Conco Sulfte 219 | — | — | — | — | — | — | — | — | — | — | — | — | 85 | — |

The residual hydrocarbons described in Sections 7.2.4. through 7.2.10. were successfully emulsified into stable pre-atomized fuels with certain of the surfactant packages listed in Table XVIII. For the California and Oklahoma vacuum resids, the preferred surfactant package was Package #19. For the Union cutback tar, the preferred surfactant package was Package #25. Package #18 was preferred for use with the German visbreaker resid and Package #17 was preferred for the Texas visbreaker resid, the ROSE resid and the catalytically hydrogenated residual oil.

Table XIX lists the types of oils that have and have not yet been successfully emulsified into stable emulsions (see Section 3) with various surfactant packages. All the oils listed as having been successfully emulsified to form stable emulsions can be emulsified with a surfactant package comprising 15% α-emulsan (technical grade), 42.5% Tergitol NP-40, and 42.5% Alfonic 1412-A (weight percent) used at 1 part per 500 parts oil by weight. The method used for determining paraffin and aromatic content (weight percent) is described in Sections 7.2.11 and 7.2.12.

TABLE XIX

PARAFFIN/AROMATIC CONTENT AND EMULSION STABILITY

| Oil Type | Asphaltene % | Paraffin % | Aromatic % | Form Stable Emulsions* |
|---|---|---|---|---|
| Boscan Crude | 22 | 18 | 60 | yes |
| Uinta Crude | 2 | 83 | 15 | no |
| So. Calif. Fuel Oil | 69 | 12 | | no |
| Texas Fireflood Crude | 26 | 51 | | yes |
| Bombay Crude | | 75 | 8 | no |
| Number 6 Residual Fuel Oil | 39 | 23 | 38 | yes |
| Jibaro Crude | | 19 | 64 | yes |
| El Jobo Crude | | 13 | 52 | yes |
| Kansas Crude | | 48 | 41 | yes |

*See Section 3 for description of stable emulsions.

EFFECT OF METHANOL IN AQUEOUS PHASE ON PRE-ATOMIZED FUEL VISCOSITY

Pre-atomized fuels were formed in a blender at low speed (in a manner preventing the beating of air into the emulsion) with methanol incorporated into the aqueous phase. The hydrocarbon used was a mixture of Number 6 residual fuel oils, designated Amelia Fuel oil. The specific gravity was 10.6° API. The viscosity versus temperature profile is shown in Table XX.

TABLE XX

VISCOSITY VS. TEMPEATURE FOR AMELIA FUEL OIL

| Viscosity (cp) | Temperature (°F.) |
|---|---|
| 1,046 | 100 |
| 1,405 | 90 |
| 2,190 | 80 |
| 3,578 | 70 |
| 6,209 | 60 |

The surfactant package comprised 15% α-emulsan (technical grade), 42.5% Tergitol NP-40 and 42.5% Alfonic 1412-A (w/w).

The surfactant package was added to aqueous phases containing various proportions of methanol and deionized water. The aqueous phases were blended at low speed for approximately 15 seconds to form pre-atomized fuels wherein the ratio of Amelia Fuel to aqueous phase was 70:30 (v/v). Enough of the surfactant package was added to the aqueous phase such that the final proportion of surfactant package to Amelia Fuel in the pre-atomized fuel was 1:250. Table XXI summarizes the variation of viscosity of the pre-atomized fuel as the composition of the aqueous phase was varied. The results suggest that addition of methanol up to at least about 45% does not significantly affect viscosity reduction by the surfactant package.

TABLE XXI

EFFECT OF METHANOL IN AQUEOUS PHASE ON VISCOSITY

| %[1] Methanol | %[1] Water | Viscosity (cp)[2] |
|---|---|---|
| 0 | 100.0 | 58.5 |
| 1.0 | 99.0 | 29.2 |
| 2.5 | 97.5 | 32.1 |
| 4.9 | 95.1 | 61.2 |
| 10.0 | 90.0 | 34.3 |
| 11.5 | 88.5 | 37.9 |
| 12.9 | 87.1 | 35.0 |
| 15.0 | 85.0 | 39.4 |
| 24.7 | 75.3 | 76.4 |
| 44.3 | 55.7 | 82.3 |
| 100.0 | 0 | 1753.7 |

[1]Weight percent
[2]At 100° F.

EFFECT OF WATER CONTENT ON PRE-ATOMIZED FUEL VISCOSITY

Experiments were performed with the Boscan crude oil described in Section 7.2.1, the Number 6 residual test fuel oil described in Section 7.2.3 and the Amelia Fuel oil described in Section 7.3.2 to determine the effect of variations in the proportion of the aqueous phase to oil phase on pre-atomized fuel viscosity. The surfactant package used in all three sets of experiments comprised 15% α-emulsan (technical grade), 42.5% Tergitol NP-40 and 42.5% Alfonic 1412-A (w/w). The viscosities reported in Tables XXII, XXIII and XXIV were measured on the Rheomat 30 as described in Section 7.2.11.

Boscan crude oil was emulsified at low speed in a blender (as in Section 7.3.1) in various proportions of water using a surfactant package ratio of 1:250 based on oil. Viscosities were measured at 100° F. The data are tabulated in Table XXII and presented graphically in FIG. 1.

TABLE XXII

EFFECT OF WATER CONTENT ON VISCOSITY OF BOSCAN CRUDE OIL PRE-ATOMIZED FUELS

| Water Content, % (v/v) | Viscosity (cp) at 100° F. |
|---|---|
| 24 | 202 |
| 27 | 140 |
| 30 | 111 |
| 33 | 82 |
| 35 | 51 |
| 39 | 36 |

Similarly, Number 6 residual test fuel oil was emulsified in various proportions of deionized water using a surfactant package ratio of 1:250 based on oil. Viscosities were measured at 100° F. The data are tabulated in Table XXIII.

TABLE XXIII

EFFECT OF WATER CONTENT ON VISCOSITY OF NUMBER 6 FUEL OIL PRE-ATOMIZED FUELS

| Water Content, % (v/v) | Viscosity (cp) at 100° F. |
|---|---|
| 14 | 1002.1 |
| 16 | 417.6 |
| 23 | 89.5 |
| 27 | 53.7 |
| 33 | 71.6 |

Additionally, Amelia Fuel oil was emulsified in various proportions of an aqueous phase consisting of 13.3% (w/w) methanol and 86.7% (w/w) deionized water using a surfactant package ratio of 1:250 based on oil. Viscosities were measured at 100° F. The data are tabulated in Table XXIV.

TABLE XXIV

EFFECT OF AQUEOUS PHASE CONTENT ON VISCOSITY OF AMELIA OIL PRE-ATOMIZED FUELS

| Aqueous Phase Content, % (v/v) | Viscosity (cp) at 100° F. |
|---|---|
| 18 | 1074 |
| 21 | 573 |
| 24 | 54 |
| 27 | 38 |
| 30 | 33 |

In all three cases, as the oil:water ratio was increased, the viscosity similarly increased.

TEMPERATURE EFFECTS ON HYDROCARBOSOLS

Figure 2:
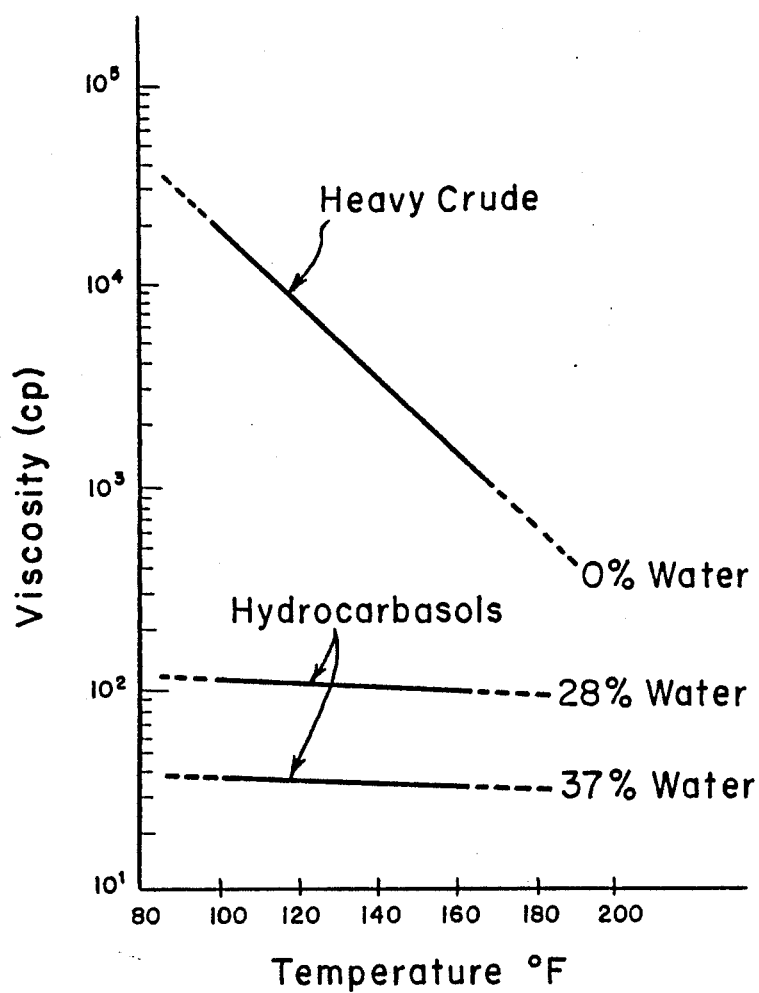
FIG. 2 is a graphical representation of the viscosity versus temperature profiles for a heavy crude oil (Boscan) and two emulsan-stabilized hydrocarbosols formulated with Boscan crude oil.
Figure 3:
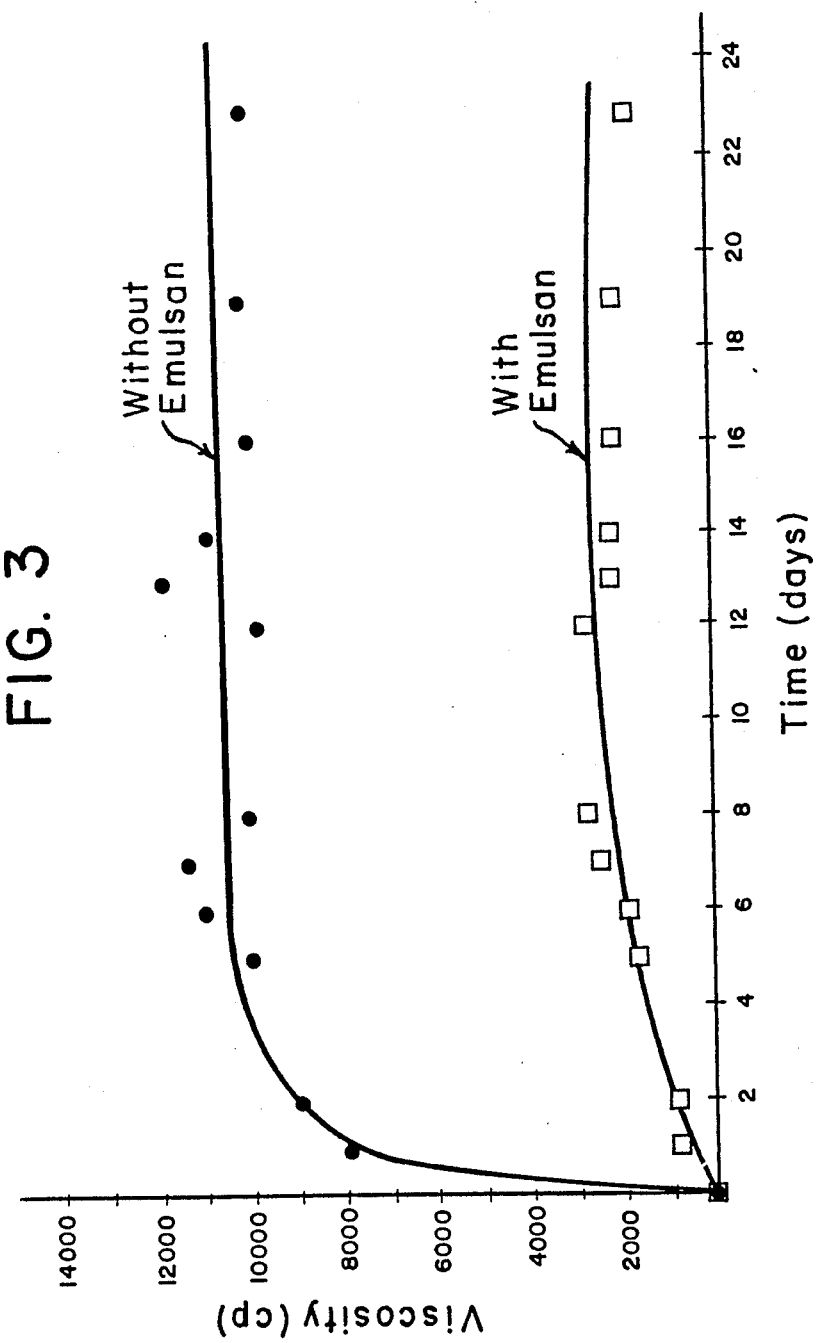
FIG. 3 is a graphical representation of the viscosity versus time profiles for two emulsions formulated with a Texas fireflood crude oil and a surfactant package comprising a nonionic surfactant and an anionic surfactant, showing the effect on viscosity of the addition of emulsan to the surfactant package.
Figure 4:
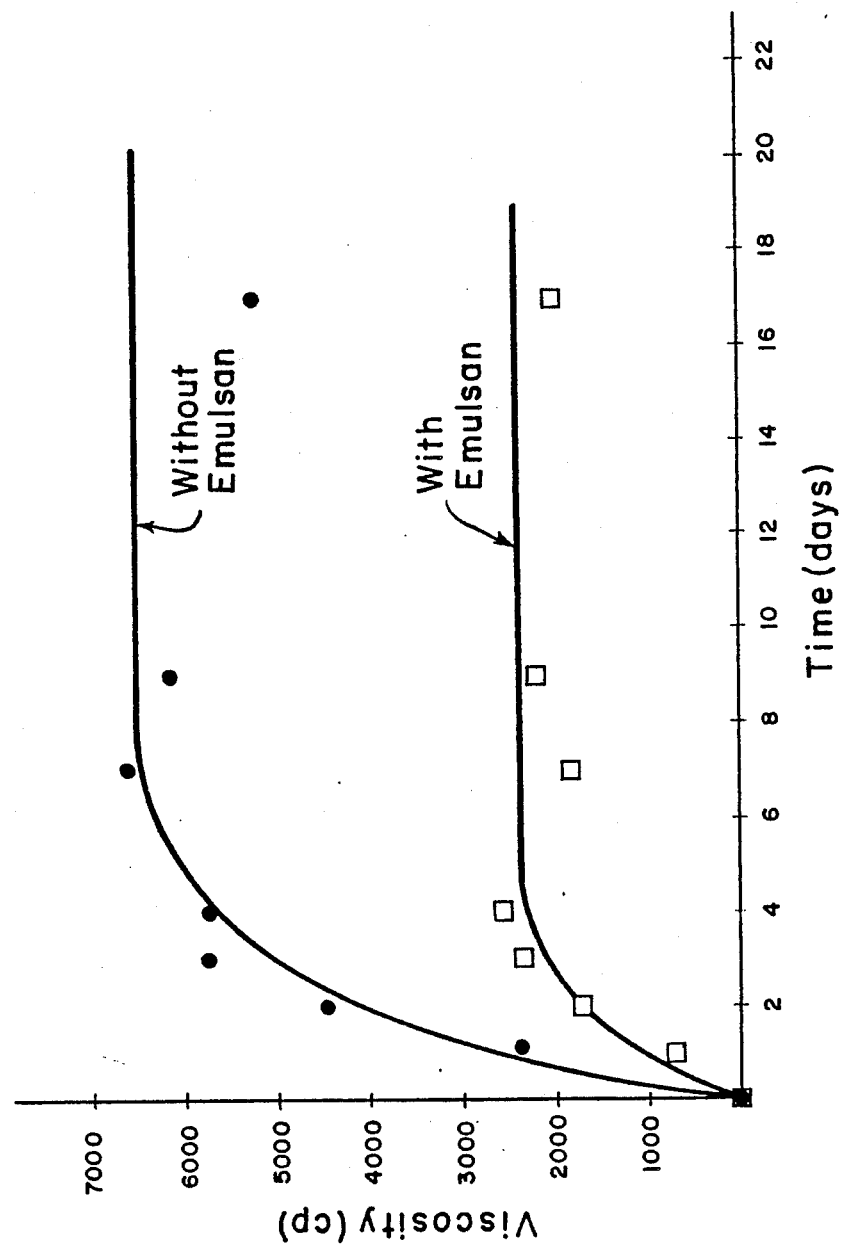
FIG. 4 is a graphical representation of the viscosity versus time profiles for two emulsions formulated with a Texas fireflood crude oil and a surfactant package comprising a nonionic surfactant, showing the effect on viscosity of the addition of emulsan to the surfactant package.
Figure 5:
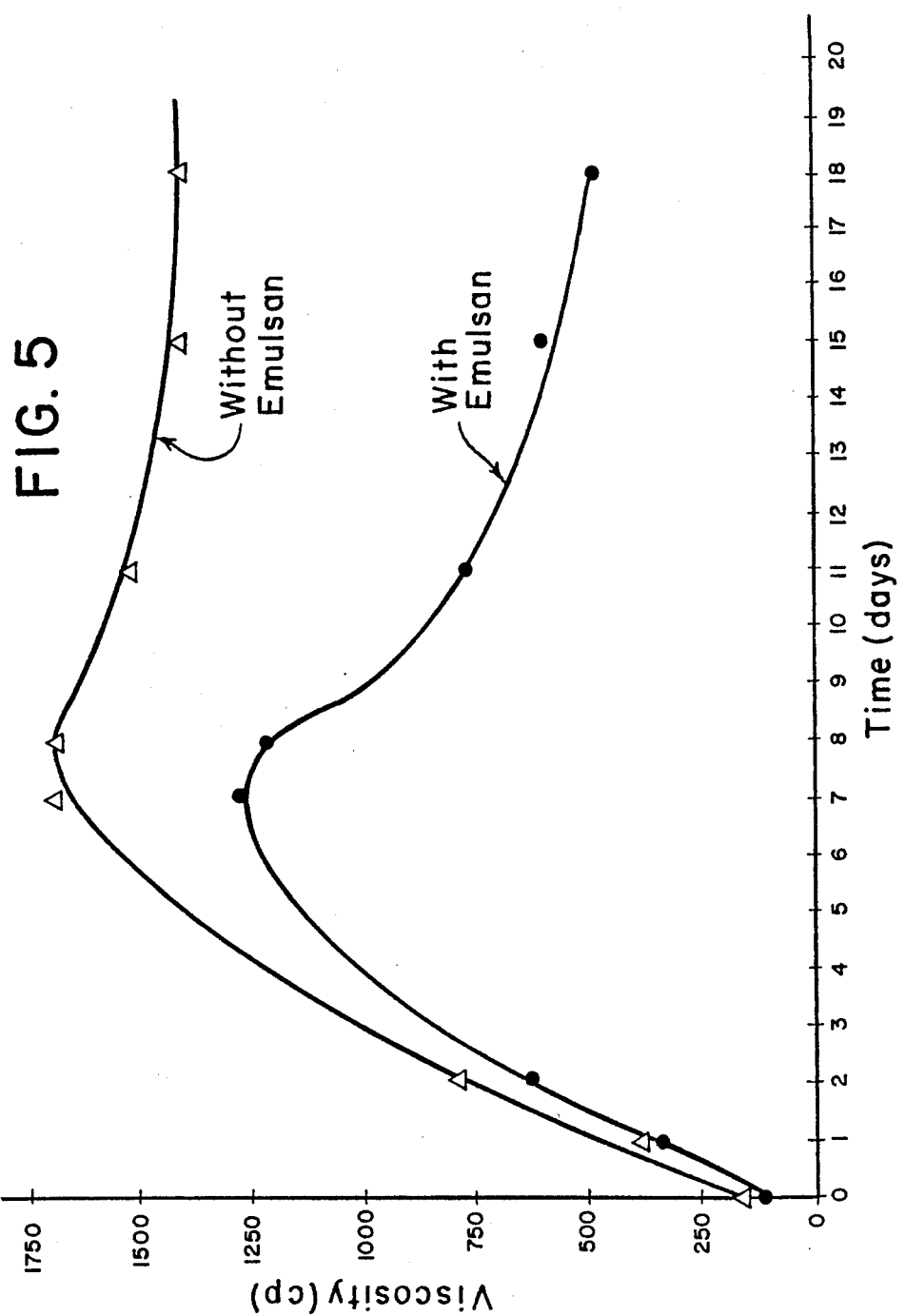
FIG. 5 is a graphical representation of the viscosity versus time profiles for two emulsions formulated with a Kansas crude oil and tap water using a surfactant package comprising a nonionic surfactant and an anionic surfactant, showing the effect on viscosity of the addition of emulsan to the surfactant package.
Figure 6:
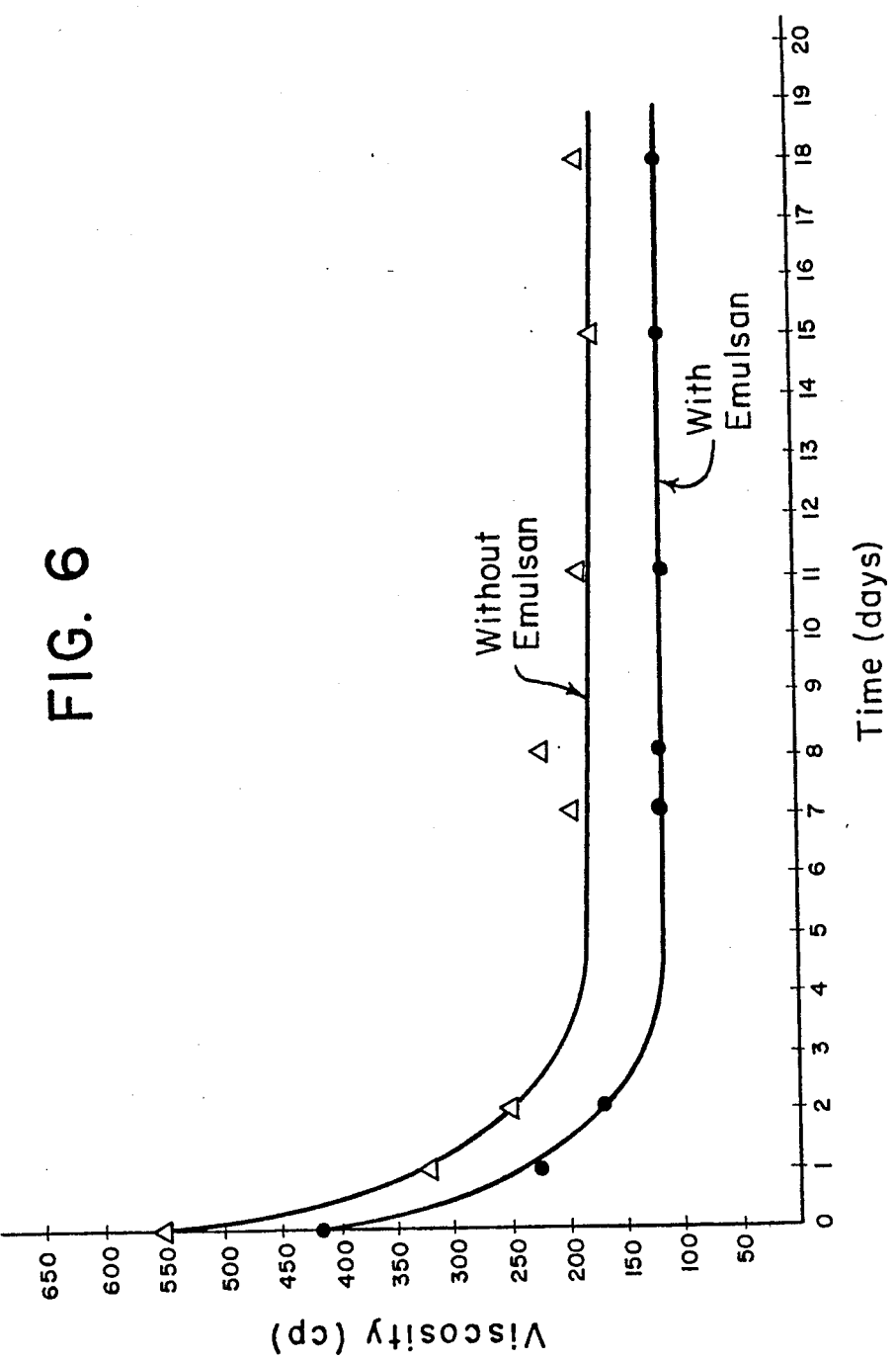
FIG. 6 is a graphical representation of the viscosity versus time profiles for two emulsions formulated with a Kansas crude oil and Texas brine using a surfactant package comprising a nonionic surfactant and an anionic surfactant, showing the effect on viscosity of the addition of emulsan to the surfactant package.

Hydrocarbosols were prepared at low speed in a blender (as in Section 7.3.1) with Boscan crude oil at oil:water ratios of 72:28 and 63:37 (v/v) using a surfactant package comprising 15% α-emulsan (technical grade), 42.5% Tergitol-NP40 and 42.5% Alfonic 1412-A, (w/w), at a ratio of 1:250 based on oil. The viscosity versus temperature profiles of emulsan-stabilized Boscan crude oil hydrocarbosols were compared to the viscosity versus temperature profiles of the unemulsified crude oil. The temperature effects on hydrocarbosols were much less pronounced than on the crude oil from which the hydrocarbosols were formulated as depicted in FIG. 2.

COMPARATIVE STATIC TESTING

The purpose of these experiments was to determine the stability under static conditions of oil-in-water emulsions of viscous crude oils made with surfactant packages comprising chemical surfactants, with or without bioemulsifier. Specifically, the determination of the time course over which the oil-in-water emulsions maintained a reduced viscosity without breaking or inverting was desired to assess the ease and success with which such emulsions can be handled for transportation and/or storage purposes. Behavior of viscous crude oil-in-water emulsions was of further interest with regard to the possiblity of pump failures and shut-downs during pipelining operations where emulsion stability is desirable to avoid emulsion breakage and circumvent the need to re-emulsify prior to re-start of operations.

Several surfactant packages, the compositions of which are shown in Table XXV, ere used to prepare oil-in-water emulsions [oil:water=70:30 on a volume per volume (v/v) basis] in which the ratio of surfactant package to oil was 1:500 on a weight per weight (w/w) basis. The surfactants used to formulate the surfactant packages of Table XXV are commercially available: Tergitol NP-40 (Union Carbide Corporation) or Alfonic 1412-A (Conoco, Inc.). The surfactant packages were formulated with or without α-emulsan (technical grade) as indicated in the table directly below.

TABLE XXV

COMPOSITIONS OF SURFACTANT PACKAGES USED IN STATIC TESTING OF EMULSION STABILITY

| Surfactnt Package | % of Component (w/w) in Surfactant Package | | |
|---|---|---|---|
| | α-Emulsan | Tergitol NP-40 | Alfonic 1412-A |
| A | 0 | 100 | 0 |
| B | 15 | 85 | 0 |
| C | 0 | 50 | 50 |
| D | 15 | 42.5 | 42.5 |
| E | 50 | 25 | 25 |

The method used to prepare oil-in-water emulsions for these experiments was as follows. Into a suitable container, an amount of crude oil was weighed so as to make up 70% (v/v) of the final emulsion. The crude oils used were the Boscan and Texas Fireflood crudes as described in Sections 7.2.1 and 7.2.2, supra and also a Kansas crude. The oil was then heated to 50°-60° C. Into a separate container, the particular surfactant package chosen (see Table XXV) was weighed so as to yield a 1:500 ratio (w/w) of surfactant package to oil in the final emulsion. Sufficient make-up water was added to the surfactant package to provide a 30% (v/v) aqueous phase in the final emulsion. Three types of aqueous phases were used: tap water, deionized water, or Texas brine. The Texas brine comprised ions in the following approximate concentrations [in parts per million (ppm)]: sodium, 28,600; calcium, 1,800; magnesium, 290; ferric, 27; barium, 17; chloride, 47,900; bicarbonate, 540; and sulfate, 12. The aqueous phase was added to the oil phase and blended using typical blender blades at low speed, as in Section 7.3.1, i.e., in a manner preventing the beating of air into the emulsion. The individual emulsions were stored in sealed containers for periods of up to 29 days. The viscosity was measured daily with a Brookfield RVT Viscometer (Brookfield Engineering), equipped with an RV3 spindle, at 10 rpm at ambient (70°-80° F.) temperature. Five groups of emulsions were subjected to the test and their compositions are indicated in Table XXVI.

TABLE XXVI

EMULSION COMPOSITIONS[1]

| Group | Oil | Aqueous | Surfactant Package[2] |
|---|---|---|---|
| 1 | Texas Fireflood Crude | Tap Water | C<br>D |
| 2 | Boscan Crude | Deionized Water | A<br>B |
| 3 | Boscan Crude | Texas Brine | A<br>B |
| 4 | Texas Fireflood Crude | Deionied Water | A<br>B |
| 5 | Texas Fireflood Crude | Texas Brine | A<br>B |
| 6 | Kansas Crude[3] | Tap Water | C<br>D |
| 7 | Kansas Crude | Texas Brine | C<br>D |

[1]All emulsions were 70:30, oil:water (v/v).
[2]Surfactant Packages are defined in Table XXV and were used at 1:500, surfactant package:oil (w/w), except for Groups 6 and 7 where the proportion was 1:1,000.
[3]Kansas crude oil has a viscosity of 1,127 cp at 76° F. The specific gravity is 0.941 and the API gravity is 18.9° API.

The results for Groups 1-7 (see Table XXVI) are tabulated in Tables XXVII-XXXII, respectively.

TABLE XXVII

STATIC TEST DATA - GROUP 1

| | % α-Emulsan (w/w) in Surfactant Package | | |
|---|---|---|---|
| | 0 | 15 | 50 |
| Time (days) | Viscosity (cp) | | |
| 0 | 155 | 92 | 138 |
| 1 | 7850 | 700 | 6900 |
| 2 | 8920 | 720 | 2802 |
| 5 | 9920 | 1616 | 3700 |
| 6 | 10960 | 1790 | 6234 |
| 7 | 11385 | 2425 | 5130 |
| 8 | 10067 | 2717 | 4100 |
| 12 | 9800 | 2791 | 3495 |
| 13 | 11820 | 2107 | 3900 |
| 14 | 10880 | 2133 | 2997 |
| 16 | 10000 | 2060 | 2800 |
| 19 | 10200 | 2060 | 2570 |
| 23 | 10100 | 1732 | 2288 |
| 29 | 11700 | 1948 | 2760 |

TABLE XXVIII

STATIC TEST DATA - GROUP 2

| | % α-Emulsan (w/w) in Surfactant Package | |
|---|---|---|
| | 0 | 15 |
| Time (days) | Viscosity (cp) | |
| 1 | 65 | 76 |
| 2 | 76 | 84 |
| 3 | 84 | 122 |
| 4 | 91 | 122 |
| 7 | 84 | 129 |
| 9 | 53 | 122 |
| 17 | 60 | 122 |

TABLE XXIX

STATIC TEST DATA - GROUP 3

| | % α-Emulsan (w/w) in Surfactant Package | |
|---|---|---|
| | 0 | 15 |
| Time (days) | Viscosity (cp) | |
| 1 | 160 | 152 |
| 2 | 167 | 152 |
| 3 | 144 | 163 |
| 4 | 141 | 129 |
| 7 | 167 | 144 |
| 9 | 130 | 129 |
| 17 | 144 | 122 |

TABLE XXX

STATIC TEST DATA - GROUP 4

| | % α-Emulsan (w/w) in Surfactant Package | |
|---|---|---|
| | 0 | 15 |
| Time (days) | Viscosity (cp) | |
| 1 | 2443 | 733 |
| 2 | 4492 | 1775 |
| 3 | 5799 | 2371 |
| 4 | 5776 | 2580 |
| 7 | 6616 | 1847 |
| 9 | 6190 | 2204 |
| 17 | 5282 | 2037 |

TABLE XXXI

STATIC TEST DATA - GROUP 5

| Time (days) | % α-Emulsan (w/w) in Surfactant Package | |
|---|---|---|
| | 0 | 15 |
| | Viscosity (cp) | |
| 1 | 114 | 103 |
| 2 | 137 | 91 |
| 3 | 106 | 84 |
| 4 | 110 | 106 |
| 7 | 110 | 114 |
| 9 | 99 | 118 |
| 17 | 84 | 91 |

TABLE XXXII

STATIC TEST DATA - GROUP 6

| Time (days) | % α-Emulsan (w/w) in Surfactant Package | |
|---|---|---|
| | 0 | 15 |
| | Viscosity (cp) | |
| 0 | 171 | 114 |
| 1 | 380 | 342 |
| 2 | 798 | 633 |
| 7 | 1697 | 1279 |
| 8 | 1691 | 1222 |
| 11 | 1526 | 773 |
| 15 | 1406 | 602 |
| 18 | 1406 | 494 |

TABLE XXXIII

STATIC TEST DATA - GROUP 7

| Time (days) | % α-Emulsan (w/w) in Surfactant Package | |
|---|---|---|
| | 0 | 15 |
| | Viscosity (cp) | |
| 0 | 551 | 418 |
| 1 | 323 | 228 |
| 2 | 253 | 171 |
| 7 | 196 | 133 |
| 8 | 222 | 133 |
| 11 | 184 | 114 |
| 15 | 171 | 114 |
| 18 | 184 | 114 |

The results for Group 1 indicate that for emulsions of the Texas fireflood crude in tap water, the addition of 15% (w/w) α-emulsan (technical grade), to a surfactant package containing co-surfactants Tergitol NP-40 and Alfonic 1412-A was preferable to the addition of 50% (w/w) α-emulsan and was also preferable to excluding α-emulsan from the surfactant package. The results for Group 2 indicate that for emulsions of the Boscan crude in deionized water, the addition of 15% (w/w) α-emulsan to a surfactant package containing Tergitol NP-40 only did not improve viscosity reduction, although the measured viscosities of either emulsion, i.e., with or without α-emulsan, were acceptably reduced. The results for Group 3 indicate that for emulsions of the Boscan crude in Texas brine, the addition of α-emulsan to a surfactant package containing Tergitol NP-40 alone did not yield significantly different results from the surfactant package without α-emulsan. Nevertheless, either surfactant package, i.e., with or without α-emulsan yielded acceptably reduced viscosities. The results further demonstrated that brine can be used as aqueous phase. The results for Group 4 indicate that for emulsions of the Texas fireflood crude in deionized water, the addition of 15% (w/w) α-emulsan to a surfactant package containing Tergitol NP-40 only is preferable to omitting α-emulsan from the surfactant package. The results of Group 5 indicate that for emulsions of the Texas fireflood crude in Texas brine, the addition of α-emulsan to a surfactant package containing Tergitol NP-40 alone did not yield significantly different results from the surfactant package without α-emulsan. Nevertheless, either surfactant package, i.e., with or without α-emulsan yielded acceptably reduced viscosities. Comparison of the Group 4 data with that of Group 5 dramatically illustrates the effect of different aqueous phases on the viscosities of Texas fireflood crude oil-in-water emulsions. The data indicate that the use of Texas brine is preferable to the use of deionized water for forming oil-in-water emulsions with Texas fireflood crude. The results for Groups 6 and 7 indicate that for emulsions of the Kansas crude in tap water or Texas brine, the addition of 15% (w/w) α-emulsan to a surfactant package containing co-surfactants Tergitol NP-40 and Alfonic 1412-A was preferable to the exclusion of α-emulsan from the surfactant package. The data from these groups illustrate how the viscosity versus time profiles of emulsions of the same crude oil can vary dramatically as a function of the aqueous phase and also that the viscosity versus time behavior of one type of crude oil/water emulsion can be signficantly different than that of other crude oil/water emulsions.

That the presence of α-emulsan in surfactant packages used to emulsify Texas fireflood crude oil or Kansas crude oil has a significant effect on emulsion stability and maintenance of reduced viscosities can be seen in FIGS. 3, 4, 5 and 6 where the data from Groups 1, 4, 6 and 7 (Tables XXVII, XXX, XXXII and XXXIII for 0% and 15% α-emulsan) are presented graphically. The lower curves in each figure represent the viscosity versus time profiles for α-emulsan-stabilized hydrocarbosols. The viscosities of the α-emulsan-stabilized hydrocarbosols remain significantly more reduced than that of the emulsions formed with surfactant packages that did not include α-emulsan.

STABILIZER COMPARISONS

Figure 7:
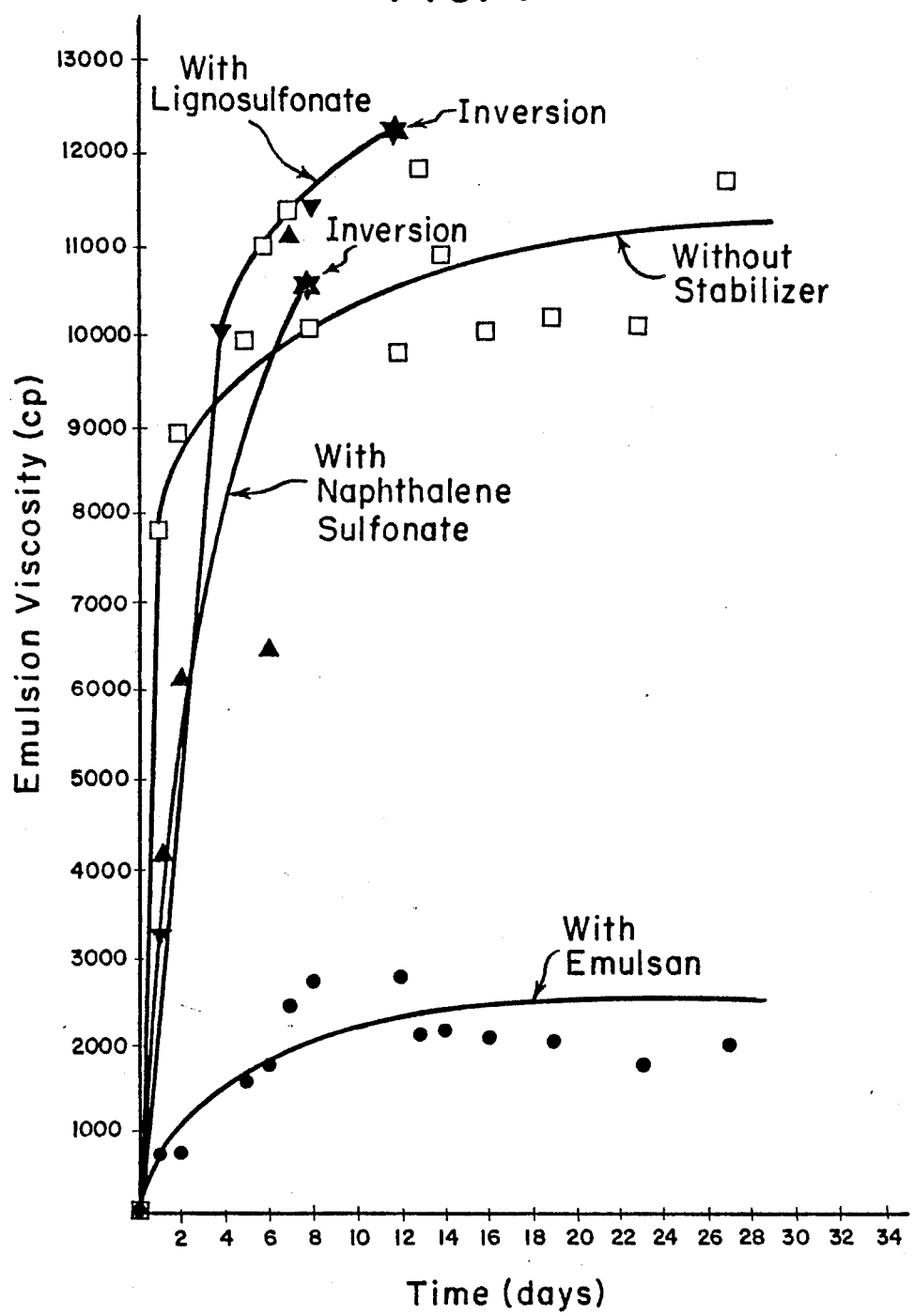
FIG. 7 is a graphical representation of the viscosity versus time profiles for four emulsions formulated with a Texas fireflood crude oil and a surfactant package comprising a nonionic surfactant and an anionic surfactant, comparing the effect on viscosity of the addition of an emulsion stabilizer (emulsan, or the commonly used emulsion stabilizers, lignin sulfonate and naphthalene sulfonate) to the surfactant package.

An experiment was performed to compare the emulsion-stabilizing effect of α-emulsan with that of known chemical emulsion-stabilizers, naphthalene sulfonate and lignin sulfonate. Specifically, the viscosity versus time profiles at 75° F. were followed for four emulsions containing either α-emulsan, naphthalene sulfonate or lignin sulfonate or no stabilizer at all. All emulsions were formulated with the Texas fireflood crude described in Section 7.2.2. at an oil:water ratio of 70:30 (v/v). Surfactant packages were used at a ratio of 1:500 (w/w) based on oil. The results are shown in FIG. 7. The α-emulsan-stabilized hydrocarbosol was formulated with a surfactant package comprising 15% α-emulsan (technical grade), 42.5% Tergitol NP-40, and 42.5% Alfonic 1412-A (w/w); its viscosity versus time profile is the curve depicted by closed circles. The naphthalene sulfonate-stabilized emulsion was formulated with a surfactant package comprising 15% naphthalene sulfonate, 42.5% Tergitol NP-40 and 42.5% Alfonic 1412-A (w/w); its viscosity versus time profile is the curve depicted by closed triangles. The lignin sulfonate-stabilized emulsion was formulated with a surfactant package comprising 15% lignin sulfonate; 42.5% Tergitol NP-40 and 42.5% Alfonic 1412-A (w/w); its viscosity versus time profile is the curve depicted by closed inverted closed triangles. A fourth emulsion (the control) was formulated with a surfactant package comprising 50% Tergitol NP-40 and 42.5% Alfonic 1412-A (w/w) with no additional emulsion stabilizer; its viscosity versus time profile is the curve depicted by open squares.

Immediately after emulsion formation a zero time point measurement was taken. Thereafter the emulsions were allowed to remain stationary for 28 days during which time period viscosities of the four emulsions were measured daily to determine the increase, if any, in viscosity. The points in FIG. 7 represented by stars indicate that by day 8 for the naphthalene sulfonate stabilized emulsion and by day 12 for the lignin sulfonate-stabilized emulsion, these two emulsions had failed, i.e., inverted into water-in-oil emulsions. It can be seen from FIG. 7 that under the conditions of the experiment, α-emulsan was a significantly more effective stabilizer of Texas fireflood crude oil:water emulsions than were either of the two chemical stabilizers (lignin sulfonate and naphthalene sulfonate) or the co-surfactants (Tergitol NP-40 and Alfonic 1412-A) alone.

a-Emulsan preparations in the form of purified grade, technical grade, whole broth, supernatant, and *Acinetobacter calcoaceticus ATCC* 31012 bacterial cells (see Section 7.1.) were compared in terms of their ability to form and stabilize emulsions of Oklahoma vacuum resid. All of the emulsions were produced at an oil to water ratio of 70:30 (w/w). The aqueous phase contained 1 part surfactant package to 200 parts oil (w/w). The surfactants present at 85% (w/w) were either Triton-165, Alipal EP-110 or Alipal CO-436. Performance was characterized according to emulsion viscosity, phase separation and degree of hydrocarbon incorporation. Most differences were apparent at 2 or more days following emulsion formation. In all cases the α-emulsan preparation comprised 15% (w/w) of the total surfactant package present. Technical grade α-emulsan produced less viscous emulsions than the purified product, regardless of the co-surfactants present. The α-emulsan in whole broth, supernatant and cells respond differently depending upon the co-surfactant used. The most advantageous results are seen with the whole broth. Whole broth repeatedly produced more fluid emulsions than the technical and purified products. All α-emulsan preparations were not equally effective in maintaining stable, low viscosity emulsions for extended periods of time. The α-emulsan present in cells has shown variable results in maintaining emulsions exhibiting reduced viscosities, but this material consistently prevented creaming. Additionally, enzyme treatment offers little benefit in the performance of the emulsans for preparing emulsions with this hydrocarbon. Thus, due to the consistent results obtained with whole broth, it is the α-emulsan source of choice for the emulsification of Oklahoma vacuum resid.

α-Emulsans produced by *Acinetobacter calcoaceticus ATCC* 31012 cultures which utilized soap stock as the carbon source displayed results similar to those obtained from cultures grown on ethanol.

Preparations of materials produced by NS strains of *Acinetobacter calcoaceticus* as described in Section 7.1.2. were used to form and stabilize emulsions of Oklahoma vacuum resid. All of the emulsions were produced at an oil-to-water ratio of 70:30 (w/w). The aqueous phase contained 1 part surfactant package to 200 parts oil (w/w). The surfactant present at 85% (w/w) was Alipal CO-436. In all cases the NS materials comprised 15% (w/w) of the total surfactant package.

In addition to the bioemulsifiers, there are conventional synthetic surfactants which are also known emulsion stabilizers: lignin sulfonates and naphthalene sulfonates are examples of such materials. Replacement of α-emulsan with these surfactants also allows production of oil-in-water emulsions. However, the lignin sulfonates do not produce emulsions of reduced viscosity, whereas the naphthalene sulfonates are generally satisfactory replacements for α-emulsan for use with viscous residuals. These naphthalene sulfonates not only produce very fluid emulsions, they also minimize, if not entirely prevent, creaming of the oil. These particular anionic surfactants perform well with all of the co-surfactants mentioned earlier, and will successfully produce emulsions.

MIXING OF A SLURRY WITH A PRE-ATOMIZED FUEL

The composition of a surfactant package that was successfully used both to form a stable pre-atomized fuel from a California vacuum resid and to form a stable slurry from a ROSE resid is listed in Table XVIII, Package 17. The α-emulsan used was prepared from a technical grade of emulsan as described in Section 7.1.1. The surfactants Lignosol BD (Reed Ltd. Chemical Div.), Triton X series (Rohm & Haas Co.), and Tergitol NP series (Union Carbide Corp.) are commercially available. Both the pre-atomized fuels and slurries were formed in an Osterizer Galaxy 14 blender at high speed in a manner which prevents the incorporation of air into the resulting dispersion. The ratio of California resid and ROSE resid to their respective aqueous phases was 70:30 by weight (w/w). The surfactant package was used at a ratio of 1:100 (surfactant/hydrocarbon) by weight (w/w) for both the preatomized fuel and the slurry. The surfactant package comprising 42.8% Triton X-405, 28.6% Tergitol NP-40, 14.2% Lignosol BD, and 14.2% technical grade α-emulsan was the preferred surfactant package for use with both California vacuum resid and ROSE resid. Results of mixing the slurry with the pre-atomized fuel are listed in Table XXXIV.

TABLE XXXIV

| VISCOSITY OF PRE-ATOMIZED FUEL/ SLURRY MIXTURE | |
|---|---|
| | Viscosity (cp) |
| 1. Pre-Atomized Fuel | 220 |
| 2. Slurry | 515 |
| 3. 50/50 Pre-Atomized Fuel/ Slurry by weight (w/w) | 175 |

FORMATION OF PRE-ATOMIZED FUELS AT HIGH TEMPERATURES UNDER PRESSURE

The composition of a surfactant package that was successfully used to form a stable pre-atomized fuel at a high temperature and under pressure was as folows: 88.5% (w/w) Nacconal 90-F (Stepan Chemical Co.), a linear dodecyl benzene sulfonate and 11.5% α-emulsan whole broth. The α-emulsan used was prepared from a post-fermentation whole broth as described in Section 7.1.2. The ratio of the hydrocarbon phase to the aqueous phase was 70:30 (California vacuum resid/tap water) by weight. The surfactant was used at a ratio of 1:200 (surfactant/hydrocarbon) by weight. The pre-atomized fuel was formed as described in Section 6.3. with the folowing modification: the pre-atomized fuel was formed at 300° F. and approximately 70 psi pressure was maintained in order to prevent the vaporization of the aqueous phase. The pre-atomized fuel was then cooled to a temperature lower than 212° F. using an appropriate heat exhange device and pressure was released. The foregoing experiment was performed with a surfactant package containing only Nacconal 90-F with similar results.

FORMATION OF PRE-ATOMIZED FUELS USING A THERMALLY CRACKED HYDROCARBON DISCHARGE

The composition of a surfactant package that was successfully used to form a stable pre-atomized fuel from a German Visbreaker resid was as folows: 50% Triton X-705 (w/w) (Rohm & Haas Co.), 33.3% Tergitol NP-70 (Union Carbide Corp.) and 16.7% whole broth α-emulsan. The α-emulsan used was prepared from a post-fermentation whole broth according to the methods described in Section 7.1.2. The pre-atomized fuel was formed in an Osterizer Galaxy 14 blender at the highest speed setting in a manner which prevents the incorporation of air into the resulting dispersion. The ratio of the hydrocarbon phase to the aqueous phase was 69.2:30.8 by weight (w/w). The surfactant package was used at a ratio of 1:350 (surfactant/hydrocarbon) by weight (w/w).

The method used to form the pre-atomized fuel is described in Section 6.3 with the following modifications: The water used to form the pre-atomized fuel was divided into two parts: 37.5% by weight of the water was placed in a container and partially frozen to make a slush and 62.5% by weight of the water was combined with the surfactant package and used to form a pre-atomized fuel as described in Section 6.3. The ratio of the hydrocarbon phase to the aqueous phase at this point was 78.3% by weight German visbreaker resid and 21.7% by weight water/surfactant package. The newly formed hot pre-atomized fuel was then combined with the remaining water which had been frozen and the total mixture was immediately placed in an ice bath. This caused an immediate and rapid quenching of the pre-atomized fuel to a temperature at least about 100° F. below the softening point of the hydrocarbon. The pre-atomized fuel produced utilizing this method has been observed to be stable and maintain a reduced viscosity for several weeks.

PIPELINING PILOT TEST

A pilot scale field test was conducted to determine how a hydrocarbosol would perform under simulated pipelining conditions. Approximately 29 barrels (BBL) of the Boscan crude oil described in Section 7.2.1. were emulsified into approximately 12 barrels of aqueous phase to form an oil-in-water emulsion. The final oil phase to aqueous phase ratio was 70/30 (v/v). The aqueous phase consisted of tapwater supplied by the Tulsa, Oklahoma municipal system (total dissolved solids: 221 ppm; total hardness: 151 ppm). Emulsification was accomplished by mixing warm oil with surfactant-containing aqueous phase using a centrifugal pump. The surfactant package used comprised α-emulsan (technical grade) and Tergitol NP-40 at 15% and 85% by weight, respectively. The surfactant package was used at a treatment rate of 1 part surfactant package to 500 parts oil by weight.

Figure 8:
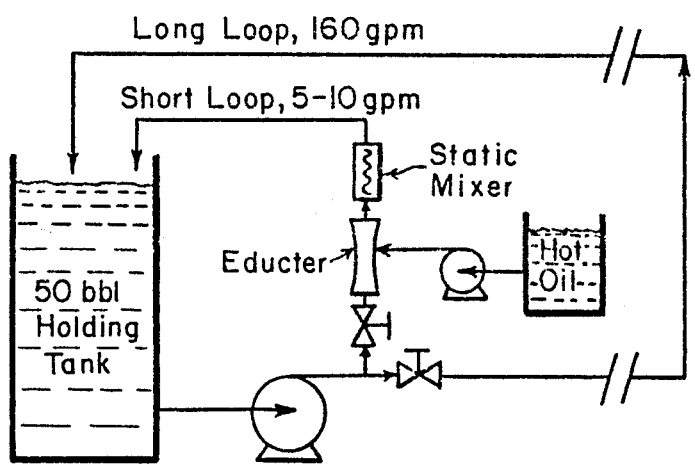
FIG. 8 is a schematic representation of a pilot system used for forming and pumping a hydrocarbosol through a three-inch pipeline.

The resulting hydrocarbosol was continuously circulated in a pipe loop at an average velocity of 6.7 ft/sec (3.125 inch I.D., 2,560 feet long) for 96 hours using a centrifugal pump. This is shown schematically in FIG. 8.

During the entire test run the observed hydrocarbosol viscosity remained less than 100 cp. [Pressure drop/flow rate data indicated an apparent viscosity of approximately 70 cp at 60 F for the hydrocarbosol throughout the operation.]This is in dramatic contrast to the viscosity of the Boscan crude before emulsification, approximately 192,000 cp. At the end of the continuous test period, flow through the loop was interrupted for 64 hours to simulate a pump failure. After three days of shutdown, pumping was resumed with no apparent change in hydrocarbosol characteristics. Pressure drops and flow rates were similar after restart as prior to shutdown. There was no need to reemulsify.

During this test, the hydrocarbosol was pumped an actual physical distance of approximately 380 miles. It traversed the pump once every 17 minutes. In this manner, the hydrocarbosol was subjected to stress (shear) roughly equivalent to being pumped a distance of 26,000 miles in a commercial pipeline (considering pipe diameters, pump transits, flow rates, etc.). Such stress is known to cause failure (inversion) of oil-in-water emulsions stabilized by conventional surfactants. Laboratory evaluation of the hydrocarbosol upon completion of the test demonstrated that, should demulsification be desirable, the emulsion could be demulsified readily using standard oilfield techniques. Table XXXV summarizes the pertinent numbers, results, and conditions of the pipelining pilot test.

TABLE XXXV

| SUMMARY OF PIPELINING PILOT TEST DATA | |
|---|---|
| Oil/Water Ratio | 70/30 |
| Surfactant Package /Oil Ratio | 1/500 |
| Total Running Time | 96 hours |
| Shutdown time prior to successful restart | 64 hours |
| Average flow rate during run | 160 gpm |
| Average flow velocity | 6.69 ft/sec. |
| Pipe I.D. | 3.125 inches |
| Distance pumped | approx. 380 miles |
| Number of pump transits | approx. 530 |
| Apparent viscosity of emulsion | 70 cp |
| Viscosity of Boscan at 60° F. | 190,000 cp |
| Comparable flow rate in 20" line | 210,000 BBL/day |
| Comparable flow rate in 30" line | 475,000 BBL/day |

DIRECT COMBUSTION TEST ON PRE-ATOMIZED FUELS

FURNACE ASSEMBLY AND INSTRUMENTATION

The direct combustion test was run in a large scale (1 Megawatt) furnace assembly, essentially comprising in sequential arrangement: a burner, a brick-lined experimental chamber (also called the refractory-lined combustion tunnel), an after burner, a water-cooled (cold-wall) chamber and an exhaust section, approximately 1.14 meters (m), 4.55 m, 1.24 m, 4.55 m and 1.65 m in length, respectively. The other major components of the facility used include the systems for storage, metering, feeding and control of fuels, for pumping, preheating, and metering of the combustion air, and for cleaning and pumping the combustion products.

The furnace assembly is equipped with water-cooled probes for sampling combustion gases which are drawn off under vacuum and pass through a sample transport line to a set of continuous on-line gas analyzers, specifically a Chemiluminescent NO-NOX Gas Analyzer (Thermo Electron Corporation, Model 10A), an Infrared CO Analyzer (Beckman, Inc., Model 865), an Infrared $CO_2$ Analyzer (Beckman, Inc., Model 865) and a Paramagnetic $O_2$ Analyzer (Beckman, Inc., Model 755). The furnace assembly is also equipped with a water-cooled suction pyrometer for measuring axial flame temperatures at various flame positions within the experimental combustion tunnel. The furnace assembly is further equipped with water-cooled water quench sampling probes through which combustion gases, including particulates, are drawn off under vacuum, are quenched with water and flow through a sampling train, the first component of which is a filter (paper) for collection of solids. This equipment provides for the quantitation of solids in the combustion gases.

PREPARATION OF PRE-ATOMIZED FUEL FOR COMBUSTION TEST

The characteristics of the Number 6 residual test fuel oil used as the oil phase of the pre-atomized fuel are described in Section 7.2.3. Table XXXVI summarizes the ultimate analysis of the fuel oil. Its heating value was 18,384 Btu/lb.

TABLE XXXVI
NUMBER 6 RESIDUAL TEST FUEL OIL ULTIMATE ANALYSIS

| Constituent | % |
|---|---|
| Carbon | 85.63 |
| Hydrogen | 10.69 |
| Nitrogen | 0.47 |
| Sulfur | 2.30 |
| Oxygen | 0.91 |
| Ash | 0.08 |
| Water | 0.10 |
| Asphaltenes | 10.44 |

The Number 6 fuel oil was emulsified in water using a surfactant package comprising 15% α-emulsan (technical grade), 42.5% Tergitol NP-40, 42.5% Alfonic 1412-A (in weight percent). The surfactant package was used at a rate of 1 part per 250 parts oil (w/w). The ratio of oil to water in the resulting pre-atomized fuel was approximately 70:30 (v/v). One hundred ten gallons of pre-atomized fuel were prepared in a fuel preparation system which incorporates a Gaulin mechanical homogenizer. The aqueous solution containing the surfactant package was fed via a centrifugal pump into a mixing-T located in the Number 6 fuel oil supply line. This arrangement provided in-line pre-mixing of the oil and water prior to entering a 45 g.p.h. high-pressure mechanical homogenizer (Gaulin). The minimum homogenization pressure of 1000 psi was employed for producing the preatomized fuel. The resulting pre-atomized fuel had a viscosity ranging from 70-120 cp at 80 F.

Accurate control of both oil and water flow rates are required to maintain a constant 70/30 oil/water mass ratio during this continuous mixing process. Precise control of the water flow proved to be a problem due to the very low flow rates required, and it is estimated that the oil/water ratio varied between 65/35 and 75/25 during production. Two barrels of pre-atomized fuel were produced with the following composition: Barrel #1 - 71.25%:28.75% water by weight; and Barrel #2 - 69.78% oil:30.22% water by weight. Both barrels of pre-atomized fuel were produced one week prior to the combustion test and no separation was apparent during this time. Prior to the combustion test both barrels were stirred with a slow speed stirrer.

COMBUSTION TEST PROCEDURE

Standard procedures for firing a Number 6 fuel oil in the type of furnace assembly employed were followed with the exception that the in-line fuel heaters were not used, and the pre-atomized fuel was fired at a temperature of approximately 90° F.

The refractory-lined combustion tunnel was brought up to operating temperature (approximately 1000° C.) using natural gas. The gas gun was then removed and replaced by a standard oil gun fitted with a twin fluid atomizer of the Y-jet type. Compressed air at approximately 60 psi was used for the atomizing fluid.

The initial light-off on the oil burner was accomplished using a Number 2 oil as is standard practice. The air and fuel flow rates were then adjusted to give a thermal input of approximately 1 MW or 3.4 MM Btu/hr. A simple on-load fuel transfer from Number 2 fuel oil to the 70/30 pre-atomized fuel was then effected by transferring the suction hose from the barrel of Number 2 fuel to the barrel of pre-atomized fuel.

A significant reduction in fuel flow rate occurred shortly after transfer to the pre-atomized fuel due primarily to the higher viscosity of the pre-atomized fuel and the resultant pressure drop in the fuel lines. Stable flame conditions were maintained during the fuel transfer but good flame conditions could not be achieved as the fuel flow rate fell below the minimum required.

Initially the drop in fuel flow rate was thought to be due to blockage of the atomizer. The Y-jet atomizer was removed, cleaned, and replaced. Light-off was accomplished without any problem using the pre-atomized fuel but low fuel flow rates prevailed. A second atomizer, of the internal-mix type was then employed. Again light-off using the preatomized fuel presented no problem but the low fuel flow rate persisted.

Finally it was concluded that the flow problem was due to a partially blocked flow control valve. The nature of this blockage was not determined. A manual by-pass valve around the control valve was opened and the pre-atomized fuel-flow rate was increased to a maximum of approximately 4 lb/min (approximately 0.9 MW input). This resulted in an entirely satisfactory flame having visible characteristics very similar to those of a Number 6 fuel oil flame obtained under similar firing conditions.

A stable flame was maintained throughout the remainder of the test period, during which time minimum excess air levels, solids emissions, and axial flame temperatures were measured.

RESULTS OF PRELIMINARY COMBUSTION TEST

The ignitability and stability of the 70/30 preatomized fuel were found to be comparable with those of a Number 6 fuel-oil when fired under similar conditions in the furnace assembly used.

Flame stability was found to be acceptable even when the important combustion parameters of excess air, minimum fuel flow rate, and atomization conditions were not matched. This occurred inadvertently during light-off and when fuel-flow rates fell below the limits for acceptable flame conditions. However, these results indicated that ignition and flame stability were not major problems of the pre-atomized fuel.

Minimum excess air levels of less than 2% were achieved without any visible smoke or carbon monoxide in the flue gas. These figures compare favorably with those attainable with a Number 6 fuel oil. Table XXXVII summarizes the range of operating conditions examined during this short test in terms of excess air levels and flue gas composition, the major point of interest being the low excess air levels that were obtained.

TABLE XXXVII
EXCESS AIR DATA

| % Oxygen in Flue Gas | Excess Air | Carbon Monoxide (ppm) |
|---|---|---|
| 0.61 | 2.83 | 0 |
| 0.54 | 2.50 | 0 |
| 0.48 | 2.21 | 0 |
| 0.44 | 2.03 | 0 |
| 0.20 | 0.91 | 100–150 |
| 0.16 | 0.73 | 150 |

Pre-Atomized Fuel Input approx. 4 lb/min (0.93 MW Thermal Input)
Pre-Atomized Fuel Temperature 90° F.
Atomizer air Preheat 500° F.

The visible flame length under these conditions was approximately 6 ft. and the general appearance of the flame was very similar to that of a Number 6 fuel oil flame. The exhaust gas on exit from the high temperature combustion zone appeared to contain a small amount of 'white-smoke', very similar in appearance to that observed when firing coal-water slurries under similar conditions. This 'white-smoke' was not visible on exit from the stack and its nature was not determined.

Figure 9:
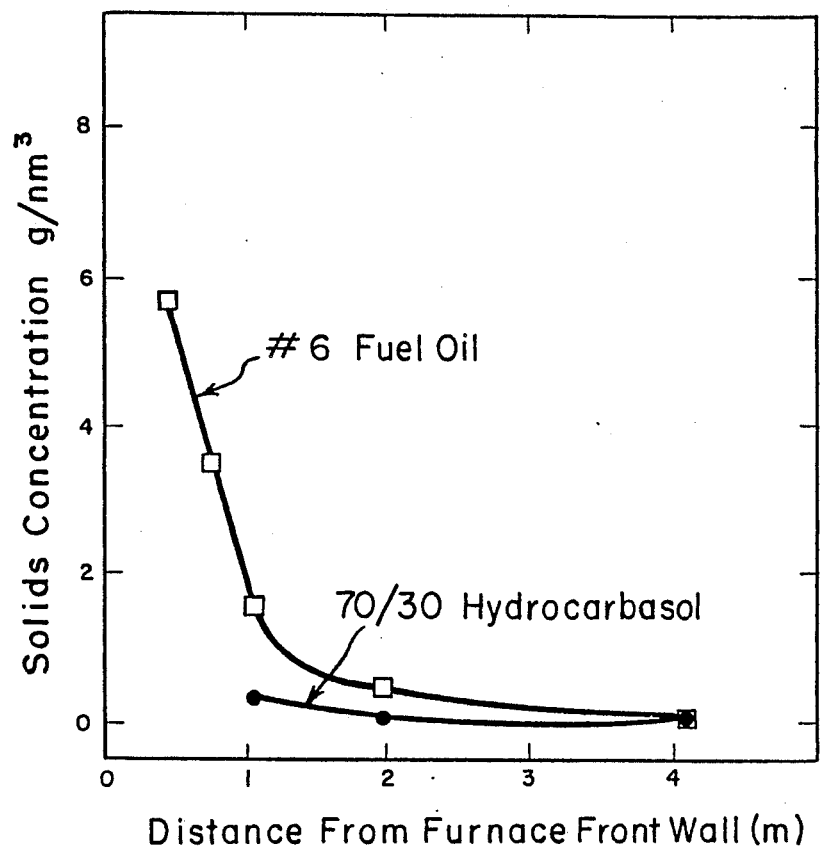
FIG. 9 is a graphical representation of the changes in solids concentration along the flame axis during combustion of a Number 6 fuel oil and a pre-atomized fuel made from Number 6 fuel oil as a function of distance from the front wall of the furnace.

A water-cooled probe was used to obtain solids samples from the exhaust gas and along the axis of the flame. FIG. 9 shows the concentration profiles along the flame axis for a Number 6 fuel oil and the 70/30 pre-atomized fuel. The solids concentration at the exit from the combustor was almost identical for these two fuels. The solids concentration within the flame was slightly lower for the 70/30 pre-atomized fuel. These two flames were obtained using two different atomizers; nevertheless the data indicate that the carbon burnout achieved with the pre-atomized fuel fired at 90.F was comparable to that for the parent Number 6 fuel fired at 240° F. to facilitate atomization.

Figure 10:
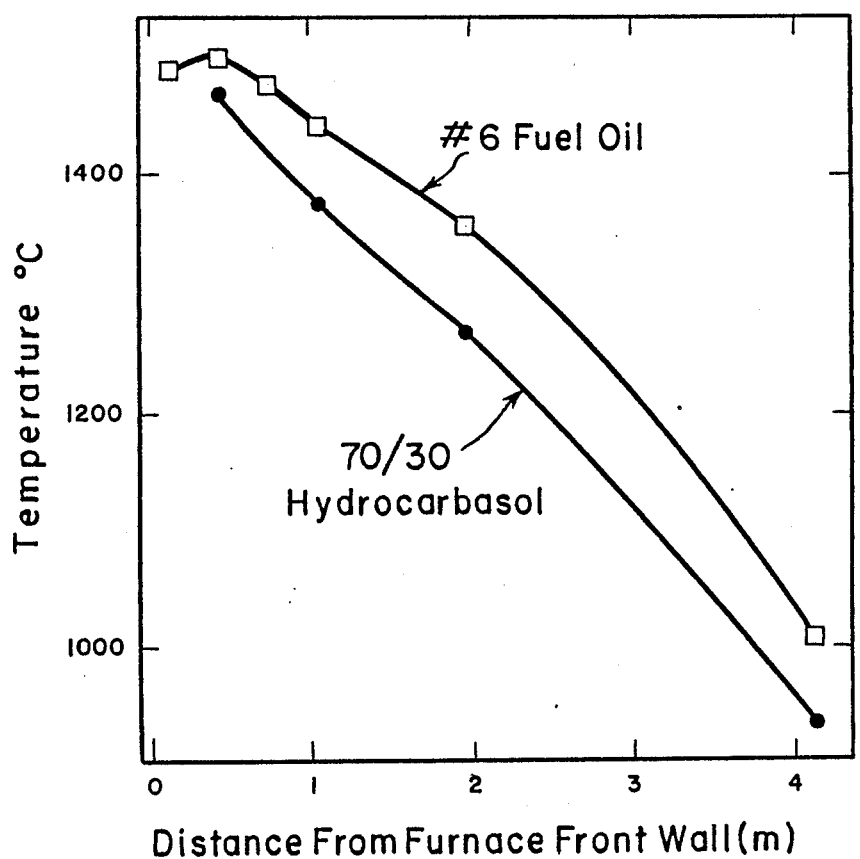
FIG. 10 is a graphical representation of the variation of axial flame temperatures during combustion of a Number 6 fuel oil and a pre-atomized fuel made from Number 6 fuel oil as a function of distance from the front wall of the furnace.

Axial flame temperatures were also measured using a water cooled suction pyrometer and these are shown in FIG. 10. The 70/30 pre-atomized fuel flame exhibited a slightly lower temperature along the entire length of the combustion chamber. This was entirely compatible with the quenching effect expected from the 30% water content. The measured reduction in flame temperature of 100°–150° C. does not represent a serious problem in most industrial combustion systems.

RESULTS OF COMBUSTION EMISSIONS TEST

Subsequent to the above combustion test, another series of test burns were made using the oils and preatomized fuels of these oils, as listed in Table XXXVII.

TABLE XXXVIII
TEST FUEL SPECIFICATOINS AND EMULSION PROPERTIES

|  | Edgington Bunker C | Crude Oil* | Mohawk Bunker C |
|---|---|---|---|
| Specific Gravity | 0.99 | 0.99 | 0.99 |
| Paraffin | 27% | 34% | 53% |
| Aromatic | 52% | 44% | 35% |

Temp. v. Viscosity

TABLE XXXVIII-continued
TEST FUEL SPECIFICATOINS AND EMULSION PROPERTIES

| °F. | CPS | CPS | CPS |
|---|---|---|---|
| 200 | 59.65 | 65.60 | 47.72 |
| 180 | 83.51 | 87.50 | 59.65 |
| 160 | 116.91 | 168.35 | 71.58 |
| 140 | 214.74 | 322.10 | 107.37 |
| 120 | 429.48 |  | 190.88 |

Pre-Atomized Fuel Viscosities 70–150 cp
Pre-Atomized Fuel Specific Gravity = 0.99
*California Kern County Procedures followed to from the pre-atomized fuels are described, supra. The primary purpose of these burns was to demonstrate the potential emissions reductions with pre-atomized fuels. In Table XXXIX the results of these burn tests are presented. The results indicate that burning such pre-atomized fuels caused significant reductions in NOX and $SO_2$ emulsions.

TABLE XXXIX
RESULTS OF BURN TESTS WITH PRE-ATOMIZED FUELS

|  | Edgington Bunker C | Mohawk Bunker C | Crude Oil* |
|---|---|---|---|
| Baseline NOX (ppm) | 550 | 450 | 355 |
| Pre-Atomize Fuel NOX (ppm) | 270 | 325 | 300 |
| % Reduction | 51 | 28 | 15 |
| Baseline $SO_2$ (ppm) | 1100 | 840 | 300 |
| Pre-Atomized Fuel $SO_2$ (ppm) | 650 | 500 | 250 |
| % Reduction | 43 | 40 | 17 |

Pre-Atomized Fuel Viscosities 70–150 cp
Pre-Atomized Fuel Specific Gravity = 0.99
*California Kern County
All Readings made at 1% $O_2$ It is apparent that many modifications and variations of this invention as hereinabove set forth may be made without departing from the spirit and scope thereof. The specific embodiments described are given by way of example only and the invention is limited only by the terms of the appended claims.

We claim:

1. A surfactant package which comprises:
   (a) at least one water-soluble surfactant, effective amount of which surfactant promotes emulsification of a hydrocarbon with API gravity of about 20° API or less, viscosity of about 100 centipoise or greater at 150° F., paraffin content of about 50% by weight or less and aromatic content of about 15% by weight or greater into an aqueous phase to form a hydrocarbon-in-water emulsion wherein the proportion of hydrocarbon to aqueous phase is about 90:10 by volume or less, the viscosity of which emulsion is reduced by at least a factor of about 10 compared to the viscosity of the hydrocarbon; and
   (b) at least one water-soluble bioemulsifier produced by a bacterium of the genus Acinetobacter, an effective amount of which bioemulsifier stabilizes a hydrocarbon-in-water emulsion formed with a hydrocarbon as in (a) by maintaining viscosity reduced by at least a factor of about 10 for a period of at least about a day under static conditions.

2. The surfactant package of claim 1 wherein the bioemulsifier is produced by *Acinetobacter calcoaceticus*.

3. The surfactant package of claim 1 wherein the bioemulsifier is produced by *Acinetobacter calcoaceticus* ATCC 31012.

4. The surfactant package of claim 1 wherein the bioemulsifier is produced by *Acinetobacter calcoaceticus* NRRL B-15847.

5. The surfactant package of claim 1 wherein the bioemulsifier is produced by *Acinetobacter calcoaceticus* NRRL B-15848.

6. The surfactant package of claim 1 wherein the bioemulsifier is produced by Acinetobacter calcoaceticus NRRL B-15849.

7. The surfactant package of claim 1 wherein the bioemulsifier is produced by *Acinetobacter calcoaceticus* NRRL B-15860.

8. The surfactant package of claim 1 wherein the bioemulsifier is produced by *Acinetobacter calcoaceticus* NRRL B-15850.

9. The surfactant package of claim 2, 3, 4, 5, 6, 7 or 8 wherein the bioemulsifier is a post-fermentation whole broth preparation.

10. The surfactant package of claim 2, 3, 4, 5, 6, 7, 8 or 9 wherein the bioemulsifier is a preparation selected from the group consisting of bacterial cells, protease-treated bacterial cells, homogenized bacterial cells, boiled bacterial cells, a supernatant fraction of post-fermentation culture broth, a protease-treated supernatant fraction of post-fermentation culture broth, a protease-treated, post-fermentation whole broth and a protease-treated, ultrafiltered supernatant fraction of post-fermentation culture broth.

11. The surfactant package of claim 1 wherein the bioemulsifier is a lipopolysaccharide.

12. The surfactant package of claim 1 wherein the bioemulsifier is a polyanionic heteropolysaccharide biopolymer.

13. The surfactant package of claim 1 wherein the bioemulsifier is $\alpha$-emulsan.

14. The surfactant package of claim 1 wherein the bioemulsifier is $\beta$-emulsan.

15. The surfactant package of claim 1 wherein the bioemulsifier is psi-emulsan.

16. The surfactant package of claim 1 wherein the bioemulsifier is selected from the group consisting of apo-$\alpha$-emulsan, apo-$\beta$-emulsan and apo-psi-emulsan.

17. The surfactant package of claim 1 wherein the surfactant is a microbially-derived glycolipid biosurfactant.

18. The surfactant package of claim 1 wherein the surfactant is a nonionic ethoxylated alkyl phenol represented by the formula $R_xC_6H_4(OC_2H_4)_nOH$ wherein R represents an alkyl group containing from about 8 to about 12 carbon atoms, x represents the number of alkyl groups ranging from about 1 to about 2, and wherein n represents the number of ethoxy groups ranging from about 1 to about 100.

19. The surfactant package of claim 19 wherein the nonionic monoalkyl phenol is selected from the group consisting of mononylphenol with at least about 10 ethoxy groups and monooctylphenol with at least about 7.5 ethoxy groups.

20. The surfactant package of claim 19 wherein the nonionic monoalkyl phenol is selected from the group consisting of mononylphenol with about 40 ethoxy groups, monooctylphenol with about 40 ethoxy groups, and monooctyl phenol with about 16 ethoxy groups.

21. The surfactant package of claim 1 wherein the surfactant is a nonionic ethoxylated alcohol represented by the formula $R(OC_2H_4)_nOH$ wherein R represents a branched or linear aliphatic group containing from about 6 to about 18 carbon atoms and wherein n represents the number of ethoxy groups ranging from about 2 to about 100.

22. The surfactant package of claim 21 wherein the nonionic ethoxylated alcohol is selected from the group consisting of ethoxylated trimethylnonanol with about 3 to about 9 ethoxy groups and ethoxylated secondary alcohol wherein the aliphatic group contains from about 11 to about 15 carbon atoms with about 7 ethoxy groups or more.

23. The surfactant package of claim 1 wherein the surfactant is a nonionic polyoxyalkylated amine represented by the formula $R_xN_y(CH_2)_2$ wherein R represents an oxyalkyl group containing from 2 to 3 carbon atoms, x represents the number of oxyalkyl groups ranging in number from about 4 to about 500 and y represents the number of nitrogen atoms ranging from about 1 to about 2.

24. The surfactant package of claim 23 wherein the nonionic polyoxyalkylated amine contains from about 50 to about 450 oxyalkyl groups.

25. The surfactant package of claim 24 wherein the nonionic polyoxyalkylated amine is a polyoxyalkylated diamine with about 50 ethoxy groups and about 60 propoxy groups.

26. The surfactant package of claim 1 wherein the surfactant is an anionic sulfated ethoxylated alkylphenol represented by the formula $RC_6H_4(OC_2H_4)_nOSO_3M$ wherein R represents an aliphatic group containing at least about 8 or carbon atoms, n represents the number of ethoxy groups ranging from about 1 to about 100, and M is ammonium, sodium, potassium, calcium or triethanolamine.

27. The surfactant package of claim 26 wherein the anionic sulfated ethoxylated alkylphenol is an ammonium salt and contains from about 4 to about 9 ethoxy groups.

28. The surfactant package of claim 27 wherein the anionic sulfated ethoxylated alkylphenol is an ammonium salt of a sulfated ethoxylated nonylphenol with about 4 ethoxy 29. The surfactant package of claim 1 wherein the surfactant is an anionic ethoxylated alcohol sulfate represented by the formula $R(OC_2H_4)_nOSO_3M$ wherein R represents an aliphatic group containing from about 6 to about 16 carbon atoms, n represents the number of ethoxy groups ranging from 0 to about 4, and M is ammonium, sodium, potassium, calcium or triethanolamine.

30. The surfactant package of claim 29 wherein the anionic ethoxylated alcohol sulfate is a sodium salt of a sulfated lauryl alcohol.

31. The surfactant package of claim 1 wherein the surfactant is an anionic alkylarylsulfonate represented by the formula $R_nAr_m(SO_3)_xM$ wherein Ar is an aromatic group which is benzyl, naphthyl, phenyl, tolyl, xylyl or ethylphenyl, R is a linear or branched chain alkyl group containing about 2 to about 16 carbon atoms, n is 1 or 2, m is 1 or greater, x is at least about 1, and M is ammonium, sodium, calcium, potassium or triethanolamine.

32. The surfactant package of claim 31 wherein the anionic alkylarylsulfonate is a sodium salt of polymerized alkylnaphthalene sulfonate.

33. The surfactant package of claim 1 which further comprises a naphthalene sulfonate or a lignosulfonate as an additional emulsion stabilizer.

34. The surfactant package of claim 18 which further comprises a second water-soluble surfactant, which second surfactant is an anionic ethoxylated or nonethoxylated alcohol sulfate represented by the formula R(OC$_2$H$_4$)$_n$OSO$_3$M wherein R represents an aliphatic group containing from about 6 to about 16 carbon atoms, n represents the number of ethoxy groups ranging from 0 to about 4, and M is ammonium, sodium, potassium, calcium or triethanolamine, said anionic surfactant being combined with the nonionic surfactant in a proportion of about 1:1 by weight.

35. The surfactant package of claim 34 wherein the ethoxylated alcohol sulfate is an ammonium salt of poly(3)ethoxy C$_{12}$–C$_{14}$ linear primary alcohol sulfate.

36. The surfactant package of claim 18 or 26 which further comprises a second water-soluble surfactant, which second surfactant is an anionic alkylaryl sulfonate represented by the formula R$_n$Ar$_m$(SO$_3$)$_x$M wherein Ar is an aromatic group which is benzyl, naphthyl, phenyl, tolyl, xylyl or ethylphenyl, R is a linear or branched chain alkyl group containing 2 to 16 carbon atoms, n is 1 or 2, m is 1 or greater, x is at least about 1, and M is ammonium, sodium, potassium, calcium or triethanolamine, said second surfactant being combined with the first surfactant in a proportion of about 1:1 to about 1:9 (second:first) by weight.

37. A surfactant package which promotes substantially stabilized emulsification of a hydrocarbon with API gravity of about 20° API or less, viscosity of about 100 centipoise or greater at 150° F., paraffin content of about 50% by weight or less and aromatic content of about 15% by weight or greater into an aqueous phase to form a hydrocarbon-in-water emulsion wherein the proportion of hydrocarbon to aqueous phase is about 90:10 by volume or less, the viscosity of which emulsion is reduced by at least a factor of about 10 compared to the viscosity of the hydrocarbon and which reduced viscosity is maintained under static conditions for a period of at least about a day, said surfactant package comprising:

(a) from about 1% to about 50% by weight of α-emulsan; and (b) from about 50% to about 99% by weight of a water-soluble nonionic surfactant selected from the group consisting of (i) an ethoxylated alkyl phenol represented by the formula R$_x$C$_6$H$_4$(OC$_2$H$_4$)$_n$OH wherein R represents an alkyl group containing from about 8 to about 12 carbon atoms, x represents the number of alkyl groups ranging from about 1 to about 2, and wherein n represents the number of ethoxy groups ranging from about 1 to about 100; (ii) an ethoxylated alcohol represented by the formula R(OC$_2$H$_4$)$_n$OH wherein R represents a branched or linear aliphatic group containing from about 6 to about 18 carbon atoms and wherein n represents the number of ethoxy groups ranging from about 2 to about 100; and (iii) a polyoxyalkylated amine represented by the formula R$_x$N$_y$(CH$_3$)$_2$ wherein R represents an oxyalkyl group containing from 2 to 3 carbon atoms, x represents the number of oxyalkyl groups ranging in number from about 4 to about 500 and y represents the number of nitrogen atoms ranging from about 1 to about 2.

38. The surfactant package of claim 37 wherein the α-emulsan is present in a range of about 10% to about 20% by weight and wherein the nonionic surfactant is selected from the group consisting of ethoxylated monononylphenol with about 40 ethoxy groups, ethoxylated monooctylphenol with about 40 ethoxy groups, ethoxylated monooctylphenol with about 16 ethoxy groups, ethoxylated monononylphenol with about 70 ethoxy groups, ethoxylated monooctylphenol with about 70 ethoxy groups, and combinations thereof, said nonionic surfactant being present in a range of about 80% to about 90% by weight.

39. The surfactant package of claim 37 wherein the o-emulsan is present in a range of about 10% to about 20% by weight and wherein the nonionic surfactant is an ethoxylated secondary alcohol in which the aliphatic group contains from about 11 to about 15 carbon atoms with about 7 ethoxy groups or more.

40. A surfactant package which promotes substantially stabilized emulsification of a hydrocarbon with API gravity of about 20° API or less, viscosity of about 100 centipoise or greater at ° 150 F., paraffin content of about 50% by weight or less and aromatic content of about 15% by weight or greater into an aqueous phase to form a hydrocarbon-in-water emulsion wherein the proportion of hydrocarbon to aqueous phase is about 90:10 by volume or less, the viscosity of which emulsion is reduced by at least a factor of about 10 compared to the viscosity of the hydrocarbon and which reduced viscosity is maintained under static conditions for a period of at least about a day, said surfactant package comprising:

(a) from about 10% to about 20% by weight of α-emulsan; and (b) from about 90% to about 80% by weight of a water-soluble anionic surfactant selected from the group consisting of (i) a sulfated ethoxylated alkylphenol represented by the formula RC$_6$H$_4$(OC$_2$H$_4$)$_n$OSO$_3$M wherein R represents an aliphatic group containing at least about 8 or carbon atoms, n represents the number of ethoxy groups ranging from about 1 to about 100, and M is ammonium, sodium, potassium, calcium or triethanolamine; (ii) an ethoxylated alcohol sulfate represented by the formula R(OC$_2$H$_4$)$_n$OSO$_3$M wherein R represents an aliphatic group containing from about 6 to about 16 carbon atoms, n represents the number of ethoxy groups ranging from 0 to about 4, and M is ammonium, sodium, potassium, calcium or triethanolamine; and (iii) an alkylarylsulfonate represented by the formula R$_n$Ar$_m$(SO$_3$)$_x$M wherein Ar is an aromatic group which is benzyl, naphthyl, phenyl, tolyl, xylyl or ethylphenyl, R is a linear or branched chain alkyl group containing about 2 to about 16 carbon atoms, n is 1 or 2, m is 1 or greater, x is at least about 1, and M is ammonium, sodium, calcium, potassium or triethanolamine.

41. A surfactant package which promotes substantially stabilized emulsification of a hydrocarbon with API gravity of about 20.API or less, viscosity of about 100 centipoise or greater at 150° F., paraffin content of about 50% by weight or less and aromatic content of about 15% by weight or greater into an aqueous phase to form a hydrocarbon-in-water emulsion wherein the proportion of hydrocarbon to aqueous phase is about 90:10 by volume or less, the viscosity of which emulsion is reduced by at least a factor of about 10 compared to the viscosity of the hydrocarbon and which reduced viscosity is maintained under static conditions for a period of at least about a day, said surfactant package comprising:

(a) from about 1% to about 50% by weight of α-emulsan; and (b) from about 50% to about 99% by weight of a combination of (i) a water-soluble nonionic ethoxylated alkyl phenol represented by the formula $R_xC_6H_4(OC_2H_4)_nOH$ wherein R represents an alkyl group containing from about 8 to about 12 carbon atoms, x represents the number of alkyl groups ranging from about 1 to about 2, and wherein n represents the number of ethoxy groups ranging from about 1 to about 100 and (ii) a water-soluble anionic ethoxylated or nonethoxylated alcohol sulfate represented by the formula $R(OC_2H_4)_nOSO_3M$ wherein R represents an aliphatic group containing from about 6 to about 16 carbon atoms, n represents the number of ethoxy groups ranging from about 0 to about 4, and M is ammonium, sodium, potassium, calcium or triethanolamine, said combination being in a proportion of about 1:1 by weight.

42. The surfactant package of claim 41 wherein the α-emulsan is present in a range of about 10% to about 20% by weight, wherein the nonionic ethoxylated monoalkyl phenol is a mononyl phenol with about 40 ethoxy groups, and wherein the anionic ethoxylated alcohol sulfate is an ammonium salt of poly(3)ethoxy $C_{12}$–$C_{14}$ linear primary alcohol sulfate, said nonionic ethoxylated monoalkyl phenol being combined with said anionic ethoxylated alcohol sulfate in about a 1:1 proportion by weight, said combination being present in the surfactant package in a range of about 80% to about 90% by weight.

43. A surfactant package which promotes substantially stabilized emulsification of a hydrocarbon with API gravity of about 20° API or less, viscosity of about 100 centipoise or greater at 150° F., paraffin content of about 50% by weight or less and aromatic content of about 15% by weight or greater into an aqueous phase to form a hydrocarbon-in-water emulsion wherein the proportion of hydrocarbon to aqueous phase is about 90:10 by volume or less, the viscosity of which emulsion is reduced by at least a factor of about 10 compared to the viscosity of the hydrocarbon and which reduced viscosity is maintained under static conditions for a period of at least about a day, said surfactant package comprising:
 (a) about 15% by weight of α-emulsan;
 (b) about 42.5% by weight of ethoxylated mononyl phenol with about 40 ethoxy groups; and
 (c) about 42.5% by weight of an ammonium salt of poly(3)ethoxy $C_{12}$–$C_{14}$ linear primary alcohol sulfate.

44. A surfactant package which promotes substantially stabilized emulsification of a hydrocarbon with API gravity of about 20 API or less, viscosity of about 100 centipoise or greater at 150° F., paraffin content of about 50% by weight or less and aromatic content of about 15% by weight or greater into an aqueous phase to form a hydrocarbon-in-water emulsion wherein the proportion of hyddrocarbon to aqueous phase is about 90:10 by volume or less, the viscosity of which emulsion is reduced by at least a factor of about 10 compared to the viscosity of the hydrocarbon and which reduced viscosity is maintained under static conditions for a period of at least about a day, said surfactant package comprising:
 (a) about 15% by weight of α-emulsan; and
 (b) about 85% by weight of ethoxylated mononyl phenol with about 40 ethoxy groups.

45. A surfactant package which promotes substantially stabilized emulsification of a hydrocarbon with API gravity of about 20° API or less, viscosity of about 100 centipoise or greater at 150° F., paraffin content of about 50% by weight or less and aromatic content of about 15% by weight or greater into an aqueous phase to form a hydrocarbon-in-water emulsion wherein the proportion of hydrocarbon to aqueous phase is about 90:10 by volume or less, the viscosity of which emulsion is reduced by at least a factor of about 10. compared to the viscosity of the hydrocarbon and which reduced viscosity is maintained under static conditions for a period of at least about a day, said surfactant package comprising:
 (a) about 15% by weight of α-emulsan; and
 (b) about 85% by weight of ethoxylated monooctyl phenol with about 40 ethoxy groups.

46. A surfactant package which promotes substantially stabilized emulsification of a hydrocarbon with API gravity of about 100 API gravity of about 20° API or less, viscosity centipoise or greater at 150° F.; paraffin content of about 50% by weight or less and aromatic content of about 15% by weight or greater into an aqueous phase to form a hydrocarbon-in-water emulsion wherein the proportion of hydrocarbon to aqueous phase is about 90:10 by volume or less, the viscosity of which emulsion is reduced by at least a factor of about 10 compared to the viscosity of the hydrocarbon and which reduced viscosity is maintained under static conditions for a period of at least about a day, said surfactant package comprising:
 (a) about 15% by weight of α-emulsan;
 (b) about 42.5% by weight of ethoxylated mononyl phenol with about 40 ethoxy groups; and
 (c) about 42.5% by weight of ethoxylated monooctyl phenol with about 40 ethoxy groups.

47. A surfactant package which promotes substantially stabilized emulsification of a hydrocarbon with API gravity of about 20° API or less, viscosity of about 100 centipoise or greater at 150° F., paraffin content of about 50% by weight or less and aromatic content of about 15% by weight or greater into an aqueous phase to form a hydrocarbon-in-water emulsion wherein the proportion of hydrocarbon to aqueous phase is about 90:10 by volume or less, the viscosity of which emulsion is reduced by at least a factor of about 10 compared to the viscosity of the hydrocarbon and which reduced viscosity is maintained under static conditions for a period of at least about a day, said surfactant package comprising:
 (a) about 17% by weight of whole broth α-emulsan;
 (b) about 50% by weight of an ethoxylated monooctylphenol with about 70 ethoxy groups; and
 (c) about 33% by weight of an ethoxylated mononylphenol with about 70 ethoxy groups.

48. A surfactant package which promotes substantially stabilized emulsification of a hydrocarbon with API gravity of about 20° API or less, viscosity of about 100 centipoise or greater at 150° F., paraffin content of about 50% by weight or less and aromatic content of about 15% by weight or greater into an aqueous phase to form a hydrocarbon-in-water emulsion wherein the proportion of hydrocarbon to aqueous phase is about 90:10 by volume or less, the viscosity of which emulsion is reduced by at least a factor of about 10 compared to the viscosity of the hydrocarbon and which reduced viscosity is maintained under static conditions for a period of at least about a day, said surfactant package comprising:
 (a) about 14% by weight of whole broth α-emulsan;

(b) about 43% by weight of an ethoxylated monooctylphenol with about 40 ethoxy groups;
(c) about 29% by weight of an ethoxylated mononylphenol with about 40 ethoxy groups; and
(d) about 14% by weight of a salt of a lignosulfonate.

49. An emulsifying agent comprising an aqueous solution in fresh water or brine containing (a) from about 10 µg/ml to about 2000 µg/ml of α-emulsan; and (b) from about 60 µg/ml to about 12,000 µg/ml of an ethoxylated mononynyl phenol with about 40 ethoxy groups.

50. An emulsifying agent comprising an aqueous solution in fresh water or brine containing (a) from about 10 µg/ml to about 2000 µg/ml of α-emulsan; and (b) from about 60 µg/ml to about 12,000 µg/ml of an ethoxylated secondary alcohol of the formula $R(OC_2H_4)_nOH$ wherein R is an aliphatic group containing about 11 to about 15 carbon atoms and n is about 7 or more.

51. An emulsifying agent comprising an aqueous solution in fresh water or brine containing (a) from about 10 µg/ml to about 2000 µg/ml of α-emulsan; (b) from about 30 µg/ml to about 6000 µg/ml of an ethoxylated mononynyl phenol with about 40 ethoxy groups; and (c) from about 30 µg/ml to about 6000 µg/ml of an ammonium salt of poly(3)ethoxy $C_{12}$–$C_{14}$ linear primary alcohol sulfate.

* * * * *